United States Patent
Son

(10) Patent No.: US 10,111,254 B2
(45) Date of Patent: Oct. 23, 2018

(54) METHOD AND APPARATUS FOR RANDOM ACCESS FOR MULTIPLE DEVICES IN WIRELESS COMMUNICATION SYSTEM

(71) Applicant: Samsung Electronics Co., Ltd., Suwon-si, Gyeonggi-do (KR)

(72) Inventor: Hyuk-Min Son, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 7 days.

(21) Appl. No.: 15/324,197

(22) PCT Filed: May 20, 2016

(86) PCT No.: PCT/KR2016/005406
§ 371 (c)(1),
(2) Date: Jan. 5, 2017

(87) PCT Pub. No.: WO2016/186478
PCT Pub. Date: Nov. 24, 2016

(65) Prior Publication Data
US 2017/0202027 A1    Jul. 13, 2017

(30) Foreign Application Priority Data
May 21, 2015   (KR) .................. 10-2015-0071248

(51) Int. Cl.
*H04W 72/00*   (2009.01)
*H04W 74/08*   (2009.01)
*H04H 20/38*   (2008.01)
*H04L 29/06*   (2006.01)
*H04L 12/26*   (2006.01)

(52) U.S. Cl.
CPC ........ *H04W 74/0833* (2013.01); *H04H 20/38* (2013.01); *H04L 43/16* (2013.01); *H04L 69/22* (2013.01); *H04W 74/085* (2013.01)

(58) Field of Classification Search
CPC . H04W 72/04; H04W 8/245; H04W 74/0833; H04M 1/72519; H04J 13/0025; H04H 20/38; H04L 69/22; H04L 3/16
USPC ................. 455/450, 550.1, 418; 370/335
See application file for complete search history.

(56) References Cited

U.S. PATENT DOCUMENTS

| | | | |
|---|---|---|---|
| 7,664,076 B2* | 2/2010 | Kim | H04J 13/0025 370/335 |
| 9,769,831 B2* | 9/2017 | Yu | H04W 72/048 |
| 2010/0103889 A1 | 4/2010 | Kim et al. | |
| 2011/0039499 A1 | 2/2011 | Zhang et al. | |

(Continued)

FOREIGN PATENT DOCUMENTS

| KR | 10-2008-0084740 A | 9/2008 |
|---|---|---|
| KR | 10-2012-0089267 A | 8/2012 |

(Continued)

*Primary Examiner* — Danh Le
(74) *Attorney, Agent, or Firm* — Jefferson IP Law, LLP

(57) ABSTRACT

A method for performing a random access by a device in a wireless communication system is provided. The method includes receiving a broadcast signal including location information which indicates each of at least two partial areas included in a transmission area of a preamble sequence, and transmitting the preamble sequence through one of the at least two partial areas on the basis of the broadcast signal.

20 Claims, 29 Drawing Sheets

(56) References Cited

U.S. PATENT DOCUMENTS

| | | | |
|---|---|---|---|
| 2012/0026965 A1* | 2/2012 | Cho | H04W 74/006 370/329 |
| 2013/0070624 A1 | 3/2013 | Nguyen et al. | |
| 2014/0016534 A1* | 1/2014 | Kim | H04W 74/0833 370/312 |
| 2014/0071930 A1 | 3/2014 | Lee et al. | |
| 2014/0226601 A1 | 8/2014 | Park et al. | |
| 2014/0269666 A1* | 9/2014 | Marsh | H04W 56/00 370/350 |
| 2014/0362806 A1* | 12/2014 | Liu | H04W 72/14 370/329 |
| 2015/0156760 A1* | 6/2015 | Yu | H04W 4/005 370/330 |
| 2015/0282213 A1* | 10/2015 | Sun | H04W 72/0413 370/329 |
| 2016/0150570 A1* | 5/2016 | Wang | H04W 4/005 370/329 |
| 2016/0173239 A1* | 6/2016 | Kim | H04L 1/1812 370/329 |

FOREIGN PATENT DOCUMENTS

| | | |
|---|---|---|
| WO | 2012/150801 A2 | 11/2012 |
| WO | 2012/150809 A2 | 11/2012 |
| WO | 2013/043008 A2 | 3/2013 |

* cited by examiner

| Configuration Index | MCS Index | Service Class | Coverage Class Index |
|---|---|---|---|
| 1 | 1 | A | 1 |
| 2 | 1 | B | 1 |
| 3 | 1 | C,D | 1 |
| 4 | 2 | A | 2 |
| 5 | 2 | B | 2 |
| 6 | 2 | C,D | 2 |
| 7 | 3 | A | 3 |
| 8 | 3 | B | 3 |
| 9 | 3 | C,D | 3 |

FIG.9B

| Configuration Index | Random Access Opportunity Index | START POINT POSITION | SEQUENCE LENGTH PER START POINT | Spreading Sequence Length |
|---|---|---|---|---|
| 1 | 1,4 | (1,5) | (5,5) | 8 |
| 2 | 2 | (1,3) | (7,7) | 16 |
| 3 | 3 | (1,3) | (3,7) | 4,16 |
|  |  | ⋮ |  |  |

FIG.9C

| Configuration Index | Frame Size | Random Access Opportunity Index | START POINT POSITION | SEQUENCE LENGTH PER START POINT | MCS |
|---|---|---|---|---|---|
| 1 | 250 ms | 1 | (1,5) | (5,5) | Any |
| 2 | 500 ms | 2 | (1,3) | (7,7) | Any |
| 3 | 800 ms | 3 | (1,3) | (3,7) | Any |
| ⋮ | | | | | |

FIG.10B

| ACK/NACK Bitmap | 1 | 0 | 0 | 1 | 0 | 0 | 0 | 0 | 0 | 1 |
|---|---|---|---|---|---|---|---|---|---|---|
| ACTIVITY PER DEVICE, I.E., WHETHER TO TRANSMIT DATA | On | Off | On | On | Off | On | Off | Off | Off | On |
| Sequence Index | 1 | 2 | 3 | 4 | 5 | 6 | 7 | 8 | 9 | 10 |

FIG.11C

METHOD AND APPARATUS FOR RANDOM ACCESS FOR MULTIPLE DEVICES IN WIRELESS COMMUNICATION SYSTEM

CROSS-REFERENCE TO RELATED APPLICATION(S)

This application is a U.S. National Stage application under 35 U.S.C. § 371 of an International application filed on May 20, 2016 and assigned application No. PCT/KR2016/005406, which claimed the benefit of a Korean patent application filed on May 21, 2015 in the Korean Intellectual Property Office and assigned Serial No. 10-2015-0071248, the entire disclosure of which is hereby incorporated by reference.

TECHNICAL FIELD

The present disclosure relates to a random access method and apparatus for a plurality of devices in a wireless communication system.

BACKGROUND

To satisfy demands for wireless data traffic, which have increased since commercialization of $4^{th}$-generation (4G) communication systems, efforts have been made to develop improved $5^{th}$-generation (5G) communication systems or pre-5G communication systems. For this reason, the 5G communication system or the pre-5G communication system is also called a beyond-4G-network communication system or a post-long term evolution (LTE) system.

To achieve a high data rate, implementation of the 5G communication system in an ultra-high frequency (mmWave) band (e.g., a 60 GHz band) is under consideration. In the 5G communication system, beamforming, massive multi-input multi-output (MIMO), full dimensional MIMO (FD-MIMO), an array antenna, analog beamforming, and large-scale antenna technologies have been discussed to alleviate a propagation path loss and to increase a propagation distance in the ultra-high frequency band.

For system network improvement, in the 5G communication system, techniques such as an evolved small cell, an advanced small cell, a cloud radio access network (RAN), an ultra-dense network, a device to device (D2D) communication, a wireless backhaul, a moving network, cooperative communication, coordinated multi-points (CoMPs), and interference cancellation have been developed.

In the 5G system, advanced coding modulation (ACM) schemes including hybrid frequency-shift keying (FSK) and quadrature amplitude modulation (QAM) (FQAM) and sliding window superposition coding (SWSC), and advanced access schemes including filter bank multi carrier (FBMC), non-orthogonal multiple access (NOMA), and sparse code multiple access (SCMA) have been developed.

The Internet, which is a human-oriented connectivity network where humans generate and consume information, is now evolving to the internet of things (IoT) where distributed entities, such as things, exchange and process information. The internet of everything (IoE) has also emerged, which is a combination of the IoT technology and the big data processing technology through connection with a cloud server.

As technology elements, such as sensing technology, wired/wireless communication and network infrastructure, service interface technology, and security technology, have been demanded for IoT implementation, a sensor network, a machine to machine (M2M), machine type communication (MTC), and so forth have been recently researched for connection between things.

Such an IoT environment may provide intelligent internet technology (IT) services that create a new value to human life by collecting and analyzing data generated among connected things. IoT may be applied to a variety of fields including smart home, smart building, smart city, smart car or connected cars, smart grid, health care, smart appliances, advanced medical services, and so forth through convergence and combination between existing IT and various industries.

Thus, various attempts have been made to apply 5G communication systems to IoT networks. For example, 5G communication technologies such as sensor networks, things communication, MTC, etc., have been implemented by schemes such as beamforming, MIMO, array antennas, and so forth. Application of the cloud RAN as the big data processing technology may also be an example of convergence of the 5G technology and the IoT technology.

The IoT/MTC system based on a wireless communication environment requires an access technique that satisfies low energy consumption and low latency to periodically or sporadically transmit small-size data packets at the same time while maintaining connections to numerous devices.

A representative example of the access technique may include a random access channel (RACH) used in LTE, carrier sense multiple access (CSMA) used in the Institute of Electrical and Electronics Engineers (IEEE) 802.11 family, and so forth. Devices performing uplink (UL) access through the LTE-based RACH transmit data using UL resources allocated thereto after multiple signaling. Thus, when massive IoT/MTC devices are served using LTE-based RACH techniques, signaling overhead occurs due to a UL grant obtaining process, causing loss in terms of energy consumption and delay.

The CSMA is based on collision control according to access after each device determines that a corresponding channel is empty. When the massive IoT/MTC devices are served using the CSMA, resource overhead for supporting more devices and signaling overhead such as Request to Send/Clear to Send may occur. Moreover, occurrence of retransmission caused by collision between devices may bring about loss such as energy consumption, delay, etc., due to additional signaling.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a frame operation method in which a preamble sequence transmission region includes at least two partial regions and interference is cancelled from detection periods of a preamble sequence and data.

In accordance with an aspect of the present disclosure, a method for performing random access by a transmission device in a wireless communication system, the method comprising: receiving, from a reception device, a broadcast signal comprising configuration information for a preamble sequence transmission region; and selecting a partial region among at least two partial regions constituting the preamble sequence transmission region based on the configuration signal included in the broadcast signal; and transmitting the preamble sequence for the random access through the selected partial region.

In accordance with another aspect of the present disclosure, a method for detecting random access by a reception device in a wireless communication system, the method comprising: generating a broadcast signal comprising configuration information for a preamble sequence transmission region; transmitting, to a transmission device, the broadcast signal; and receiving, a preamble sequence transmitted by a reception device through a partial region indicated by the configuration information among at least two partial regions constituting the preamble sequence transmission region.

In accordance with another aspect of the present disclosure, a transmission device for performing random access in a wireless communication system, the transmission device comprising: a transceiver configured to receive, from a reception device, a broadcast signal comprising configuration information for a preamble sequence transmission region; and a controller configured to select a partial region among at least two partial regions constituting the preamble sequence transmission region based on the configuration signal included in the broadcast signal, and control the transceiver to transmit the preamble sequence for the random access through the selected partial region.

In accordance with another aspect of the present disclosure, a reception device for detecting random access by in a wireless communication system, the reception device comprising: a controller configured to generate a broadcast signal comprising configuration information for a preamble sequence transmission region, and control a transceiver to receive, a preamble sequence transmitted by a transmission device through a partial region among at least two partial regions constituting the preamble sequence transmission region; and the transceiver configured to transmit the broadcast signal to a transmission device, and receive the preamble sequence transmitted by the reception device through the a partial region.

Embodiments of the present disclosure propose a frame operation method in which a preamble sequence transmission region includes at least two partial regions, from which a partial region is selected based on a service class, a channel condition, and so forth of a device to transmit a sequence, and interference is cancelled from detection periods of a preamble sequence and data, thereby reducing complexity while maintaining channel estimation performance in spite of an increase in the number of devices simultaneously connected during random access.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 9B illustrates an example of a configuration set to which configuration information to be used for random access and to be shared between a device and a reception end are mapped according to an embodiment of the present disclosure;

FIG. 9C illustrates an example of configuration information set by a reception end according to an embodiment of the present disclosure;

FIG. 10B illustrates an example of configurations for random access of a device according to an embodiment of the present disclosure;

FIG. 11C illustrates an example of a bitmap configuration according to an embodiment of the present disclosure;

Throughout the drawings, like reference numerals will be understood to refer to like parts, components, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1A:
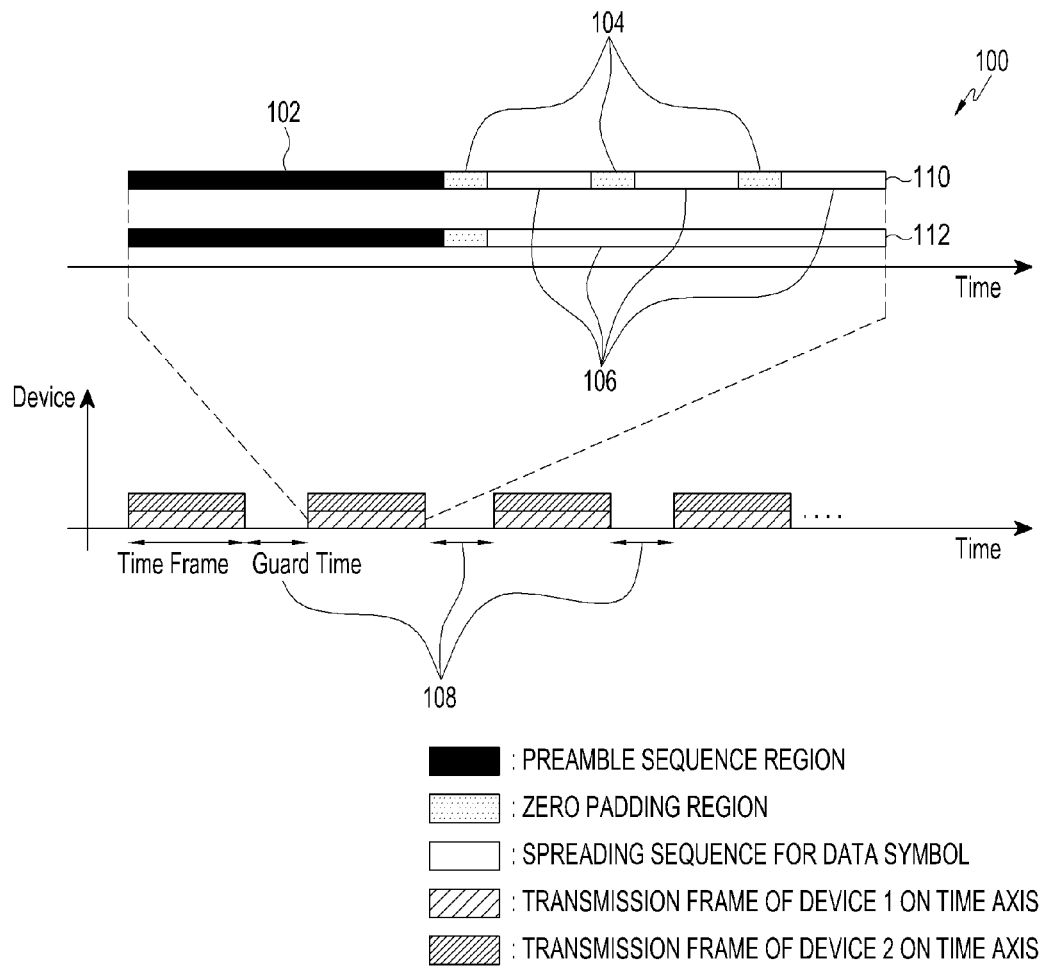
FIG. 1A illustrates an example of a frame structure to which a compressed sensing-based random access technique is applied according to an embodiment of the present disclosure.

FIG. 1A illustrates an example of a frame structure to which a compressed sensing-based random access technique is applied according to an embodiment of the present disclosure.

Referring to FIG. 1A, a frame for transmission of each of two devices, i.e., a device 1 and a device 2 is illustrated. On a time axis, each frame 100 may include a preamble sequence region 102, a zero-padding region 104 for interference cancellation in preamble sequence and data detection, and a data transmission region 106 for data transmission. The preamble sequence region 102 may be used to detect the number of users, to estimate a channel of a user, or to detect delay of a signal received by the user. According to an embodiment, the preamble sequence region 102 may be set to a region corresponding to configuration information received by a user equipment (UE) from a base station in the frame 100 or to a partial region starting from a timing selected by the UE in a predetermined region of the frame 100.

To cancel interference that may be generated due to signal transmission in consecutive frames, each frame has an interval corresponding to a guard time 108 in a time region. Multiple guard times are set for a specific time, such that devices may have a plurality of opportunities to perform random access. In FIG. 1A, a signal is transmitted in a total of four frames during a given time, and thus there is a corresponding random access opportunity (RAO).

When multiple devices perform signal transmission using frames at the same time in an arbitrary RAO, a reception end may receive overlapping signals. In an embodiment of the present disclosure, a reception end may be a base station, an access point (AP), another device, and so forth in a general communication system. In data transmission in each frame, overlapping transmission of data by using a spreading sequence may be possible. For example, referring to FIG. 1A, devices may overlappingly and simultaneously transmit multiple data the devices have to transmit, respectively, by using one long spreading sequence in one frame 112. Also, in one frame 110, one or a few data may be overlappingly transmitted continuously on a time axis by using short spreading sequences.

Meanwhile, in the data transmission region 106 of FIG. 1A, pilot symbols are spread and periodically or aperiodically transmitted together with data according to an embodiment.

Figure 1B:
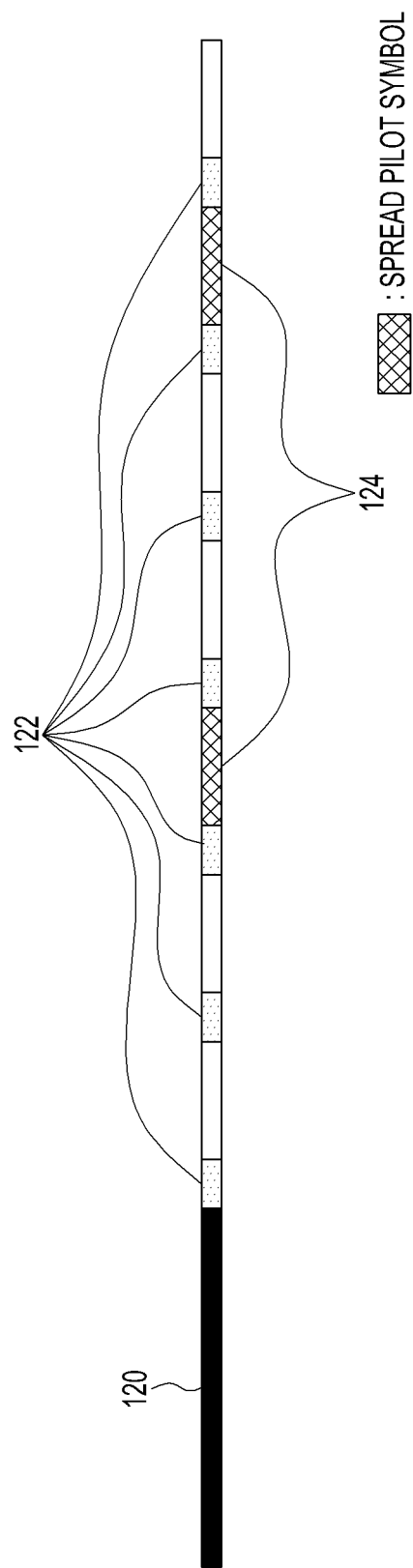
FIG. 1B illustrates an example of a structure for transmitting frame symbols through a data transmission region in a frame structure, such as the frame structure illustrated in FIG. 1A, according to an embodiment of the present disclosure.

FIG. 1B illustrates an example of a structure for transmitting frame symbols through a data transmission region in a frame structure, such as the frame structure illustrated in FIG. 1A, according to an embodiment of the present disclosure.

Referring to FIG. 1B, a device transmits a channel estimation sequence through a preamble sequence region 120 located in a first region on the time axis, and transmits a pilot symbol to correct a channel change based on a channel estimation result of a reception end. In data transmission regions 124 periodically or aperiodically disposed among data transmission regions behind the zero-padding regions 122 from the preamble sequence region 120, a pilot symbol may be transmitted. According to an embodiment, estimation may be performed with respect to an active sequence without channel estimation in the preamble sequence 120 of the frame of FIG. 1B, and channel estimation may be performed using only a pilot symbol. Hereinbelow, it is assumed that data transmitted in a frame includes both data and a pilot symbol. According to an embodiment, the zero-padding region 122 maintains zero padding between the preamble sequence region 120 and the first data transmission region 124 among the data transmission regions 124 as a guard time between the preamble sequence region 120 and the first data transmission region, and the other zero-padding regions located between the other data transmission regions may be removed. In this case, a signal transmitted in the data transmission regions 124 may include spread data and a pilot t.

In a wireless communication environment, a device may achieve uplink (UL) synchronization, i.e., timing advance, through initial access, after achieving downlink (DL) synchronization based on a DL broadcast signal.

Figure 2:
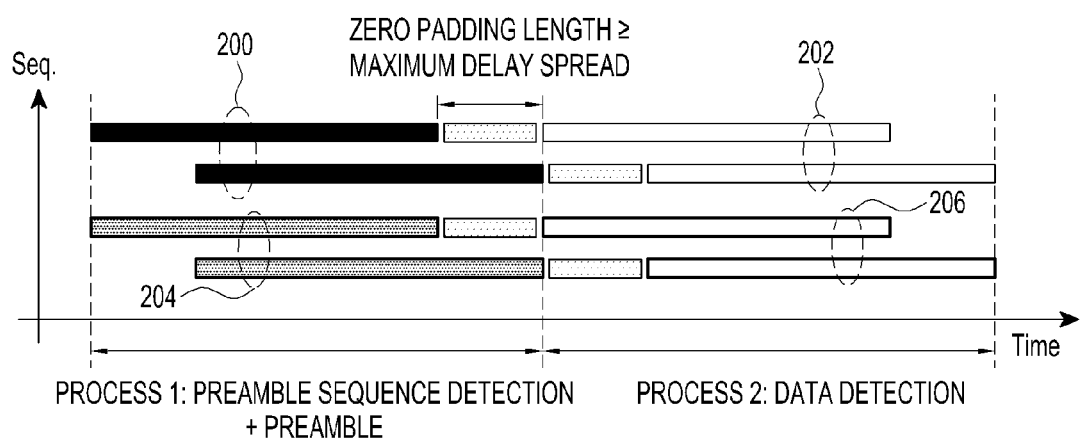
FIG. 2 illustrates an example of a structure of a frame on which uplink (UL) synchronization is performed according to an embodiment of the present disclosure.

FIG. 2 illustrates an example of a structure of a frame on which UL synchronization is performed according to an embodiment of the present disclosure. For example, it may be assumed that in a UL synchronous environment, a user of the device 1 and a user of the device 2 are connected at the same time.

Referring to FIG. 2, for example, it may be assumed that each of the two devices includes two multi-path channels and an identical delay profile is applied. Thus, on a time axis, a start point of the first channel of the device 1 and a start point of the first channel of the device 2 coincide with each other, and a start point of the second channel of the device 1 and a start point of the second channel of the device 2 also coincide with each other. Thus, start points of preamble sequence detection regions 200 and 204 of channels corresponding to the respective devices 1 and 2 coincide with each other, and start points of data detection regions 202 and 206 of the channels corresponding to the respective devices 1 and 2 also coincide with each other. In an embodiment of FIG. 2, an operation process of each device may include a first operation of performing preamble sequence detection and channel estimation based on the detection and a second operation of performing data detection. In this case, for UL synchronization, a length of a zero-padding region, which is a guard time between a preamble sequence detection region and a data detection region, is relatively clearly identified when compared to an asynchronous environment, and thus may be set equal to or longer than a maximum delay spread. Herein, the maximum delay spread is defined as a maximum value of delay that guarantees detection performance in a system configuration. The operation process may be described separately for a case where each device has a unique identifier (ID) and a case where each device has no unique ID.

First, a case where a unique ID is allocated to each device, for example, a unique preamble sequence is allocated to each of the device 1 and the device 2 will be assumed. Then, the unique ID of the device may be used for preamble sequence detection. In an embodiment of the present disclosure, a device-specific unique ID or preamble sequence may be shared in advance between a device and a reception end. According to another embodiment, a device selects a random number or sequence and transmits the selected random number or sequence to the reception end during initial attachment to a network. The reception end then generates a unique ID for the device based on the random number or sequence and delivers the generated unique ID to the device which then may obtain its unique ID.

If each device fails to be allocated with its unique ID, each device and the reception end according to an embodiment of the present disclosure include a sequence set including multiple sequences for a preamble and share a set of spreading sequences for data transmission, which are to be mapped to the multiple sequences. In this case, each device selects an arbitrary preamble sequence in the sequence set, and configures a transmission frame in a form in which multiple data transmission periods overlap by using the spreading sequences mapped to the selected sequence. Herein, the arbitrarily selected sequence may include a part of a unique ID of another device.

Figure 3:
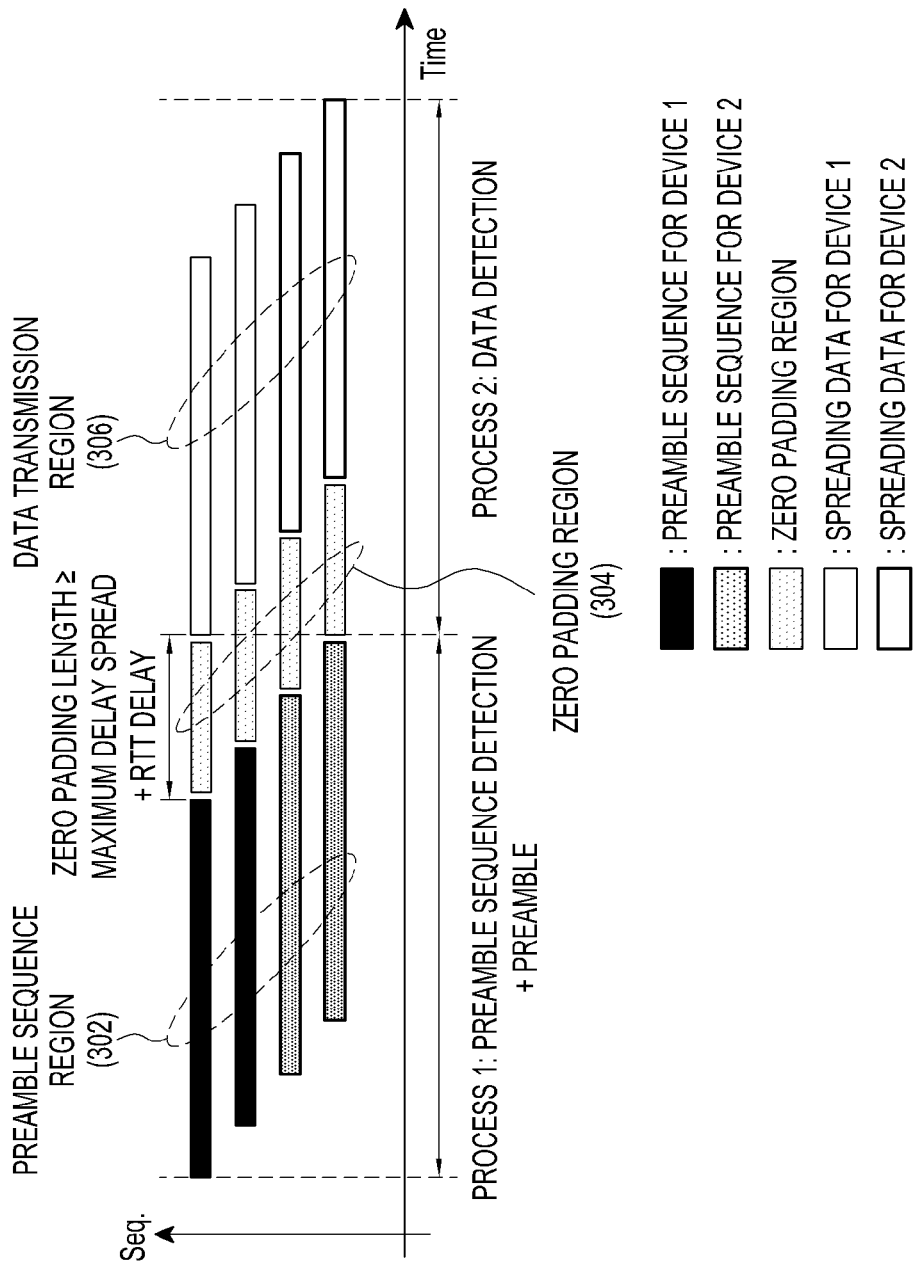
FIG. 3 illustrates an embodiment of a frame structure in which two devices are connected in a UL asynchronous environment according to an embodiment of the present disclosure.

FIG. 3 illustrates an embodiment of a frame structure in which two devices are connected in a UL asynchronous environment according to an embodiment of the present disclosure.

Referring to FIG. 3, it may be assumed that each device includes two multiple channels and an identical delay profile is applied. A basic operation process in a UL asynchronous environment is identical to the synchronous environment of FIG. 2. However, due to the asynchronous environment, a length of a zero-padding region 304 located between a preamble sequence region 302 and a data transmission region 306 for each channel to avoid interference between the preamble sequence region 302 and the data transmission region 306 needs to be designed longer than a sum of a maximum delay spread and a round trip time (RTT). Herein, the RTT may be set based on a maximum support coverage in system designing.

If receiving a frame in a synchronous/asynchronous environment as shown in FIG. 2 or 3, the reception end observes even zero-padding regions in the received frame and detects a preamble sequence. A process of the detection may include, if using a compressed sensing recovery algorithm, determining which sequence is detected among sequences of a sequence set due to characteristics of the algorithm. At the same time, the reception end performs an estimation with respect to a channel in which each sequence is transmitted. According to an embodiment of the present disclosure, preamble sequences may be applied to spreading sequences, respectively, and in this case, once identifying the preamble sequences, the reception end may identify spreading sequences mapped to the identified preamble sequences. In an embodiment of the present disclosure, one spreading sequence or multiple spreading sequences may be mapped to one preamble sequence.

When such a CS technique is applied to the internet of things (IoT)/machine type communication (MTC) system, as the number of devices that have to be supported and the number of devices that have to be accessed at the same time increase, the length of a preamble sequence and the number of preamble sequences also have to be increased, to guarantee channel estimation performance. However, as the length and number of preamble sequences increase, complexity at the reception end also increases. Therefore, embodiments of the present disclosure propose a scheme to design and operate random access for reducing complexity while securing channel estimation performance, and for supporting various IoT/MTC services.

More specifically, as the number of devices that need to be supported in the IoT/MTC system increases, the number of active devices connected at the same time increases. Thus, a length of a preamble sequence and the number of preamble sequences increase, causing complexity and processing delay in the reception end. Therefore, in an embodiment of the present disclosure, a preamble sequence region in a frame is configured with multiple partial regions, each device selects a partial region from among the multiple partial regions, and a preamble sequence is transmitted through the selected region. Thereafter, after a particular guard interval, data is transmitted on a code basis in the same region, and such a process is referred to as adaptive random access method and operation.

Although the following description will be made based on an assumption that the number of devices is 2 or 3 for convenience, the present disclosure is also applicable to more devices than 2 or 3 devices.

Figure 4:
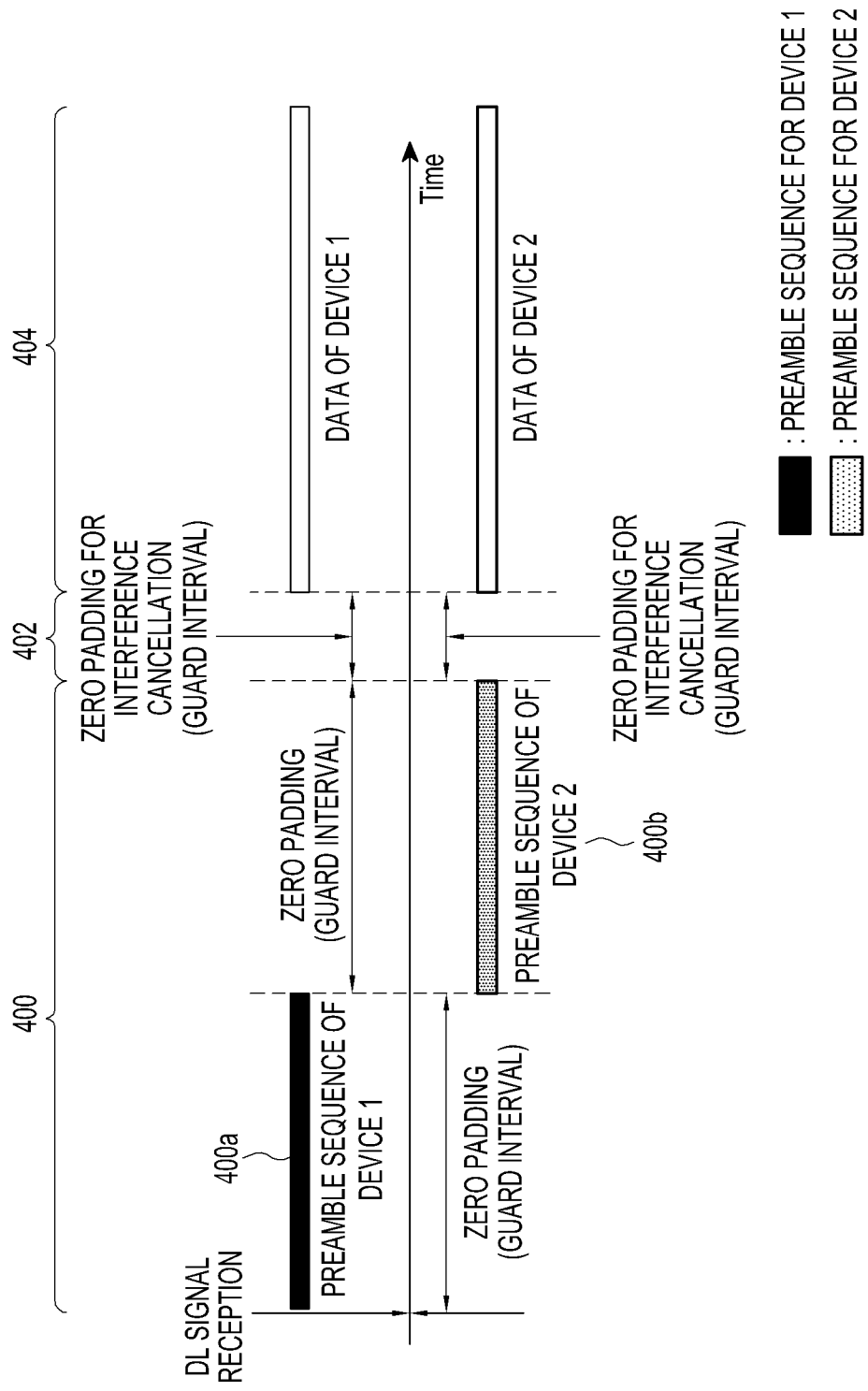
FIG. 4 illustrates an example of CS-based adaptive random access operations according to an embodiment of the present disclosure.

FIG. 4 illustrates an example of CS-based adaptive random access operations according to an embodiment of the present disclosure.

Referring to FIG. 4, it is assumed that two devices are connected at the same time. For example, it may be assumed that a preamble sequence region 400 of a transmission frame is divided into two partial regions 400a and 400b, and each device selects different partial regions and attempts access by using a preamble sequence through the selected region. More specifically, a first device selects the first partial region 400a of the preamble sequence region 400 to transmit a preamble sequence, and operates the other region as a zero-padding region. Likewise, a second device selects the second partial region 400b of the preamble sequence region 400 to transmit a preamble sequence, and operates the other region as a zero-padding region. In this way, the first device and the second device transmit a preamble sequence through non-overlapping partial regions of the preamble sequence region 400, respectively. The first device and the second device may overlappingly transmit data in a data transmission region 404 located behind a zero-padding region 402 for cancellation of interference with the data transmission region 404 from the preamble sequence region 400.

Figure 5:
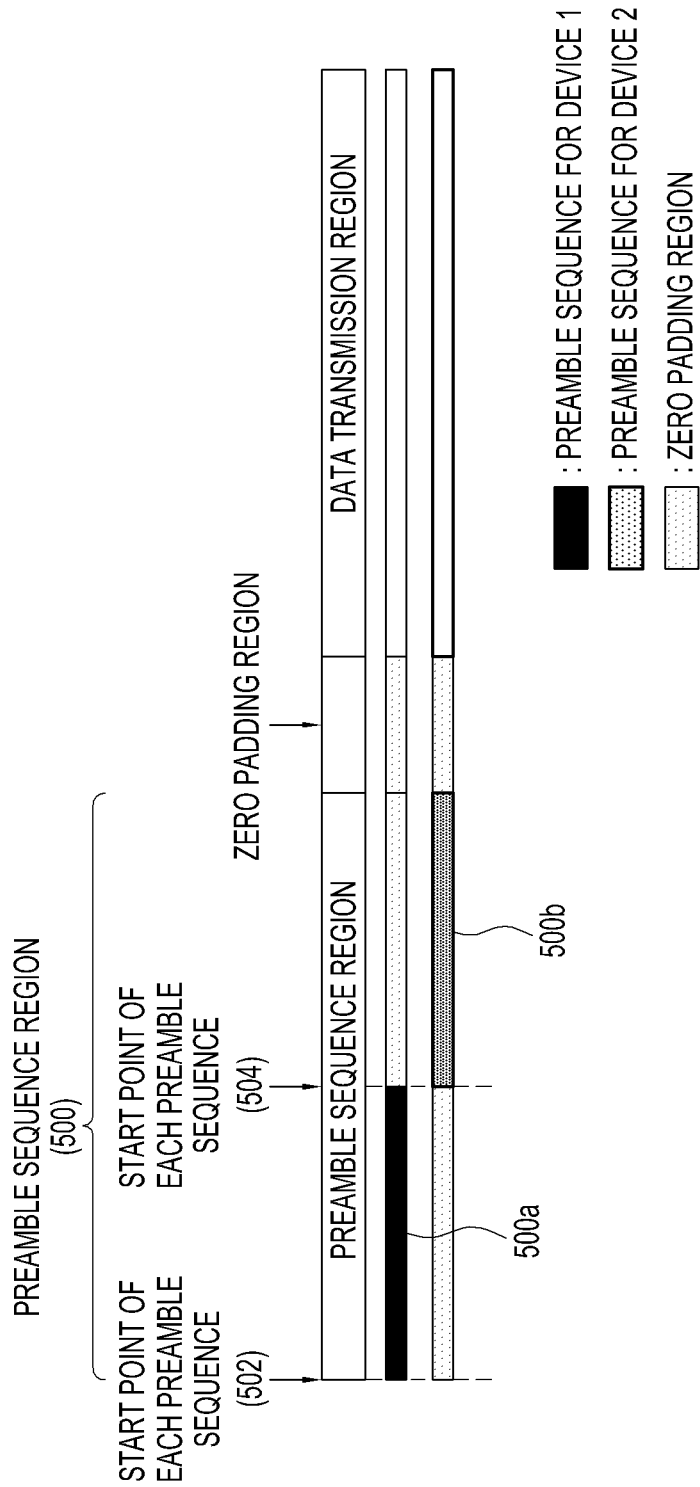
FIG. 5 illustrates an example of random access operations using load balancing according to an embodiment of the present disclosure.

FIG. 5 illustrates an example of random access operations using load balancing according to an embodiment of the present disclosure. In FIG. 5, it is assumed that devices desiring connection support an identical type of IoT/MTC services.

Referring to FIG. 5, for example, in an embodiment of the present disclosure, a preamble sequence region 500 of a frame is divided into two partial regions 500a and 500b that do not overlap each other, and different devices attempt access in each partial region. Devices attempting access receive a DL broadcast signal, select a partial region corresponding to a start point among start points included in configuration information for random access included in the DL broadcast signal, and attempt access. For example, it is assumed that the configuration information includes two start points 502 and 504. The length of the preamble sequence may be set equal to, longer than, or shorter than a distance between the start points 502 and 504. In FIG. 5, the preamble sequence region 500 is divided into the two partial regions 500a and 500b and a preamble sequence having a shorter length is transmitted through the divided partial regions 500a and 500b, thereby reducing reception complexity and processing delay. As a result, load balancing for preamble sequence transmission of devices is performed.

Figure 6:
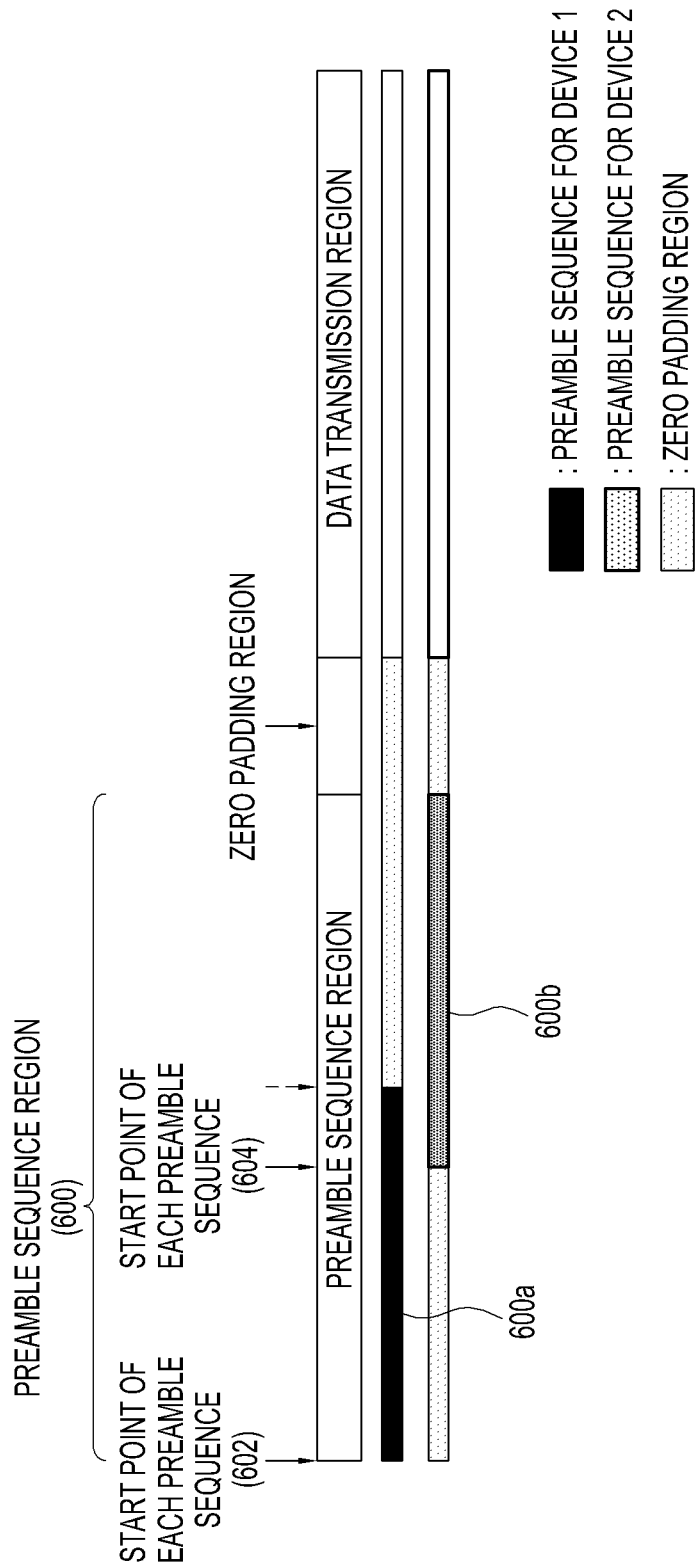
FIG. 6 illustrates an example of random access operations using load balancing according to an embodiment of the present disclosure.

FIG. 6 illustrates an example of random access operations using load balancing according to an embodiment of the present disclosure.

Referring to FIG. 6, in an embodiment of the present disclosure, like in FIG. 5, a preamble sequence region 600 of a frame is divided into two partial regions 600a and 600b. When compared to FIG. 5, the partial regions 600a and 600b partially overlap each other. In this case, a length of a preamble sequence corresponding to each partial region is longer than a distance between start points 602 and 604 of the partial regions 600a and 600b. In such a structure of the frame, interference between preamble sequences may occur through a region where the partial regions 600a and 600b overlap each other. However, as the length of the preamble sequence transmitted through each partial region increases when compared to FIG. 5, preamble performance gain may be obtained. Assuming that a preamble sequence is detected using a CS recovery algorithm in the reception end, a process of sequentially cancelling the detected sequence from a received signal is performed. As a result, in an embodiment, interference between sequences occurring in the overlapping region may be cancelled, avoiding preamble performance deterioration. Moreover, the reception end having received channel states of devices transmits the start point 602 corresponding to a front partial region among partial regions to a device having a better channel state, e.g., a better path loss. In this way, a device having a better channel state transmits a preamble sequence by using the front partial region 600a among the partial regions, thereby maximizing channel estimation performance.

Figure 7:
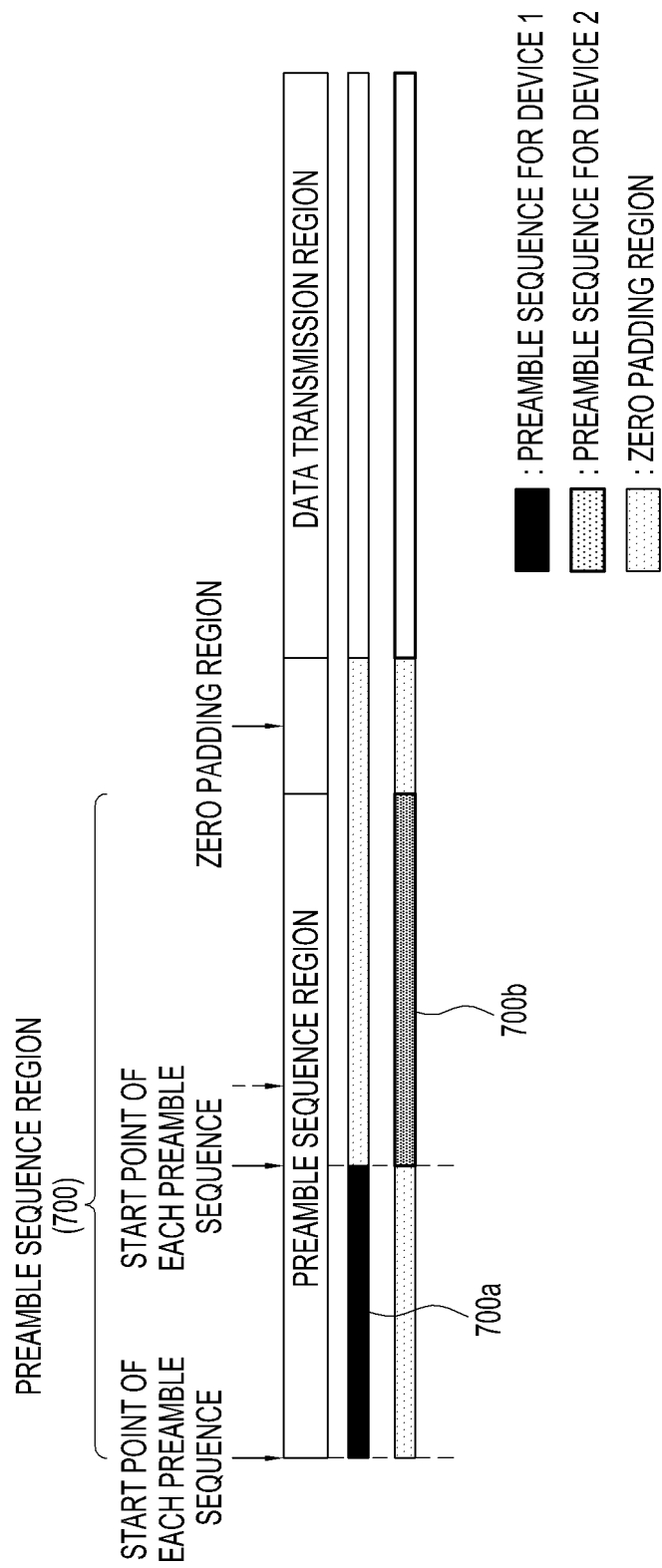
FIG. 7 illustrates an example of random access operations using load balancing according to an embodiment of the present disclosure.

FIG. 7 illustrates an example of random access operations using load balancing according to an embodiment of the present disclosure. In FIG. 7, it is assumed that devices desiring connection support various types of IoT/MTC services.

Referring to FIG. 7, in an embodiment of the present disclosure, it is assumed that different sequence lengths are applied to different types of IoT/MTC services. More specifically, it is assumed that the device 1 and the device 2 use different IoT/MTC services. To this end, in FIG. 7, two partial regions 700a and 700b into which a preamble sequence region 700 is divided have different lengths. In this case, in the present disclosure, for a sequence length corresponding to the preamble sequence region 700, the device 1 uses a sequence 700a having the shorter length than the device 2, and the device 2 uses a sequence 700b having the longer length. In the embodiment of the present disclosure, it is assumed that devices and the reception end are previously aware of a length of a sequence to be applied for each IoT/MTC service type. Thus, a device may identify a type of an IoT/MTC service to be used, configure a preamble sequence to correspond to a length mapped to the identified type, and transmit the preamble sequence to the reception end. Alternatively, the reception end identifies a type of an IoT/MTC service of a device and transmits information about a start point of a partial region corresponding to a length of a preamble sequence corresponding to the identified type as configuration information through a DL broadcast signal.

In FIGS. 5 to 7, for convenience, the description has been made of a case where two start points in a preamble sequence region are used. However, embodiments of the present disclosure may use multiple start points regardless of the number of devices, and at least two of the embodiments illustrated in FIGS. 5 to 7 may be combined.

Figure 8:
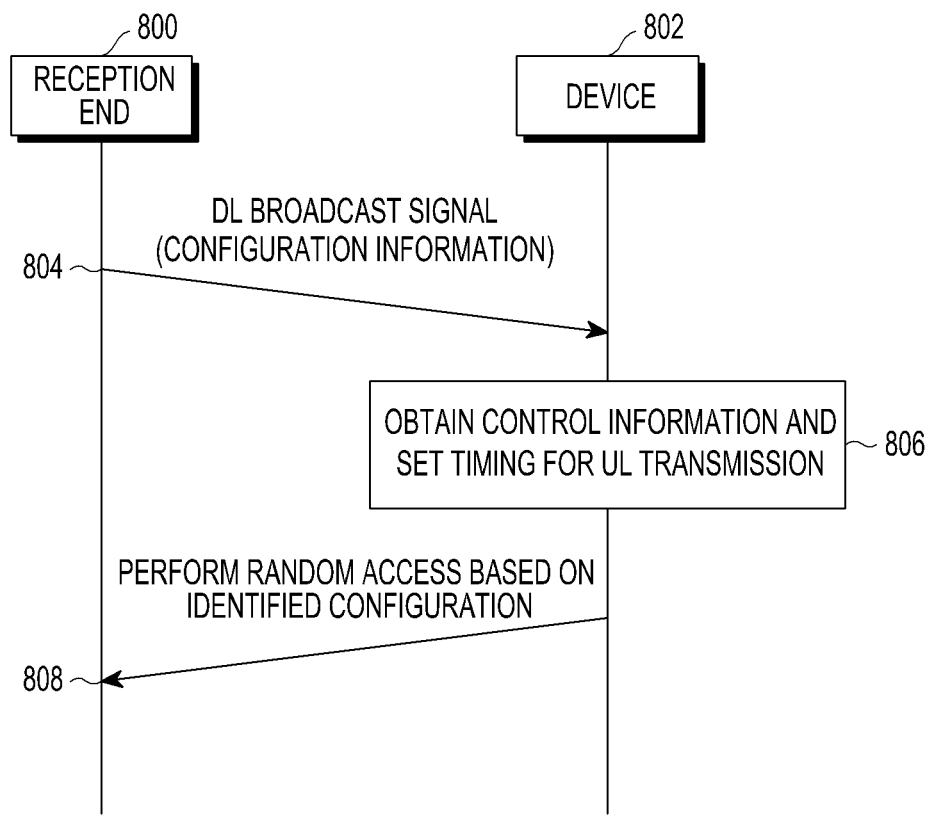
FIG. 8 is a flowchart illustrating random access operations using load balancing according to an embodiment of the present disclosure.

FIG. 8 is a flowchart illustrating random access operations using load balancing according to an embodiment of the present disclosure.

Referring to FIG. 8, in operation 804, a reception end 800 transmits a DL broadcast signal. The DL broadcast signal may include configuration information that may include at least one of a frame format, a service class and a coverage class of an IoT/MTC device, a modulation and coding scheme (MCS) level, and so forth. Herein, the service class may be classified according to a size of a packet transmitted by each device, a report period, and a target frame error of a target frame, and so forth.

A device 802 having received the DL broadcast signal sets a timing for UL transmission in operation 806, obtains control information for random access from the DL broadcast signal, that is, configuration information, and identifies a configuration corresponding to the obtained configuration information. For a UL asynchronous environment, the device 802 sets a timing for UL data transmission based on the DL broadcast signal, and for a UL synchronous environment, the device 802 achieves UL synchronization with the reception end 800.

In operation 808, the device 802 attempts random access to the reception end 800 according to an embodiment of the present disclosure by using a UL resource corresponding to the obtained configuration.

Figure 9A:
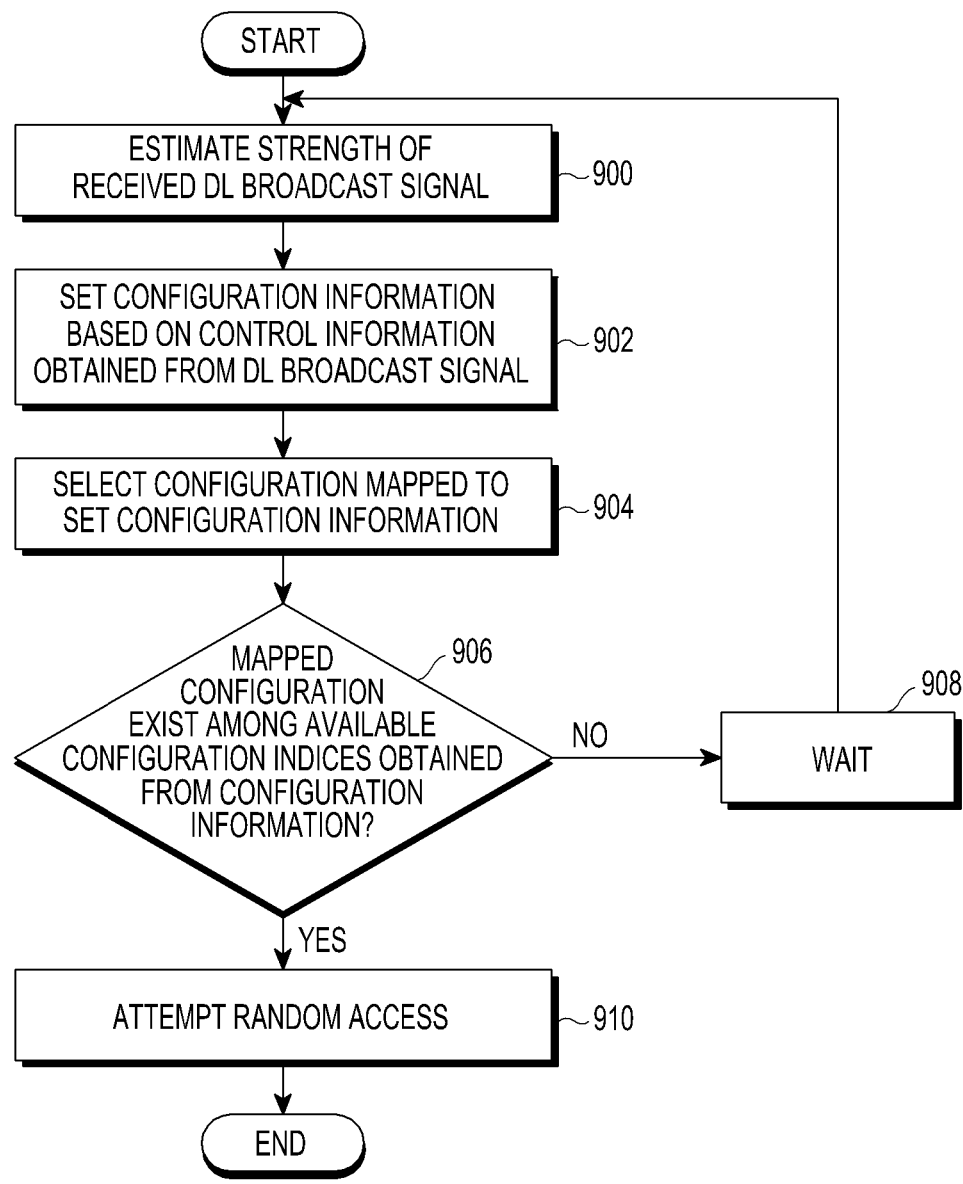
FIG. 9A is a flowchart illustrating random access operations of a device according to an embodiment of the present disclosure.

FIG. 9A is a flowchart illustrating random access operations of a device according to an embodiment of the present disclosure.

Referring to FIG. 9A, in operation 900, a device measures received strength information of a DL broadcast signal received from a reception end. In operation 902, the device configures configuration information mapped to configuration sets for random access stored in advance, based on control information obtained from the DL broadcast signal, that is, configuration information. More specifically, the device sets a coverage class based on the received strength information and selects an MCS index mapped to an MCS level corresponding to the coverage class. In operation 904, the device obtains at least one available configuration index from the DL broadcast signal. In operation 906, the device determines whether among the obtained at least one configuration index, there is a configuration index to which the coverage class that is set and the MCS index that is selected in operation 902 and a service class of the device are mapped.

FIG. 9B illustrates an example of a configuration set to which configuration information to be used for random access and to be shared between a device and a reception end are mapped according to an embodiment of the present disclosure.

Referring to FIG. 9B, each configuration index may be mapped to, for example, a coverage class, an MCS index, and a service class.

If it is determined that there is no mapped configuration information among available configuration indices, then the device waits for reception of mapped configuration information in operation 908. According to an embodiment of the present disclosure, configuration information included in a DL broadcast signal may include transmittable RAO information and frame format information for each configuration, which are mapped to an index indicating the configuration.

FIG. 9C illustrates an example of configuration information set by a reception end according to an embodiment of the present disclosure.

Referring to FIG. 9C, each configuration information may include an RAO index indicating a transmittable RAO period, positions of a start point of a region in which a preamble sequence is to be transmitted, sequence length information in each position, and a spreading sequence length. For example, a device selecting a configuration index 1 may arbitrarily select a first or fourth RAO from the entire RAO period to transmit a frame including a preamble sequence and data. The device selecting a configuration index 2 may transmit a frame including a preamble sequence and data in a second RAO.

If it is determined in operation 906 that there is the mapped configuration information, then the device performs random access to the reception end by using the mapped configuration information in operation 910.

Meanwhile, considering a service class and a coverage class of a device according to an embodiment of the present disclosure, service requirements may be identified such that a length of a preamble sequence may be set longer or shorter or set to have various lengths. Thus, the reception end according to an embodiment of the present disclosure may select a configuration index including control information corresponding to the identified service requirements.

The reception end according to embodiments of the present disclosure may operate transmission of a DL broadcast signal as below. The reception end according to an embodiment may periodically transmit a DL broadcast signal through which configuration information regarding one RAO or multiple RAOs may be transmitted. Then, the device obtains the configuration information from the broadcast signal received from the reception end, and determines whether an attempt of random access is possible during a UL resource period indicated by the obtained configuration information to attempt random access.

Figure 10A:
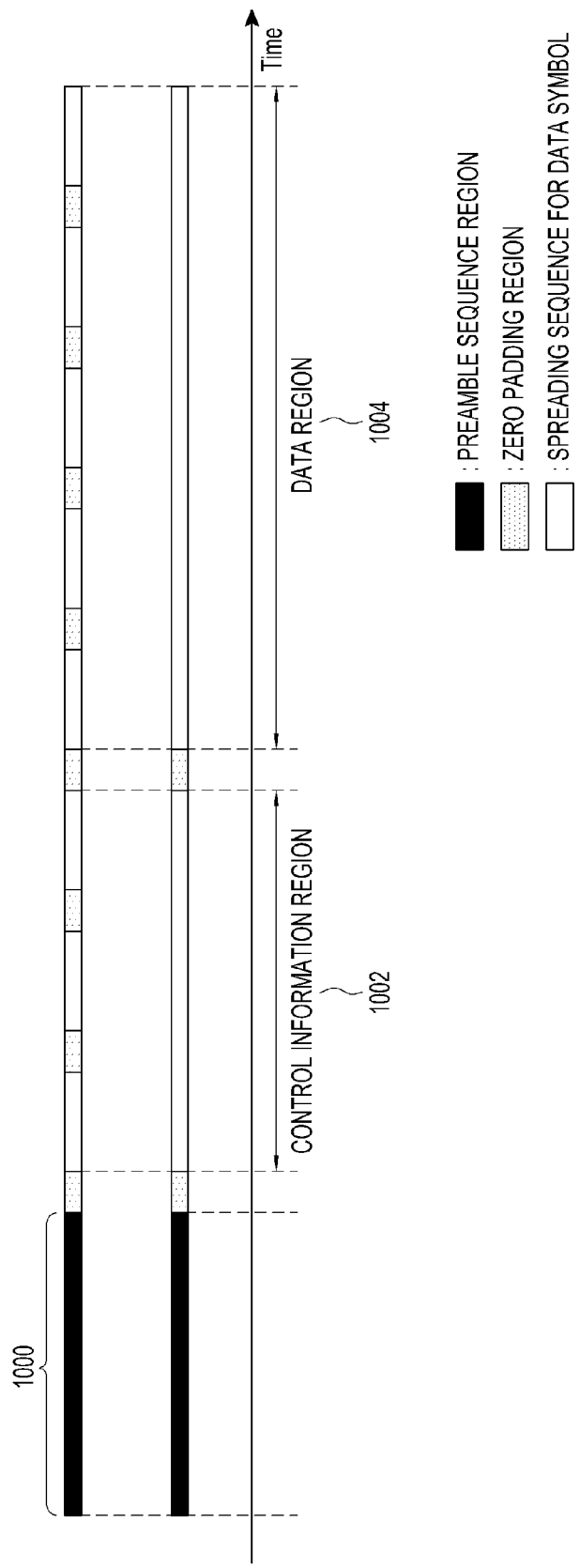
FIG. 10A illustrates an example of a frame structure in which control information and data are transmitted in different periods in a data transmission period according to an embodiment of the present disclosure.

In an embodiment of the present disclosure, to facilitate transmission of data having different MCS levels and packet sizes for given RAOs, a transmission scheme as shown in FIG. 10A may be applied.

FIG. 10A illustrates an example of a frame structure in which control information and data are transmitted in different periods in a data transmission period according to an embodiment of the present disclosure.

Referring to FIG. 10A, a transmission frame includes a preamble sequence region 1000 and a data transmission region behind a zero-padding region, in which the data transmission region is divided into a fixed control information region 1002 and a data region 1004. The control information region 1002 is set based on fixed-length spreading sequence and MCS level.

Generally, each device obtains information about accessible RAOs by receiving a DL broadcast signal. In this case, a device according to an embodiment of the present disclosure directly transmits an MCS level to be used for data transmission to the reception end through the control information region 1002. The reception end may select a configuration for random access based on a frame size, etc., corresponding to the MCS level as illustrated in FIG. 9B and FIG. 9C as described above.

Each device sets a frame size based on its MCS level, a packet size, and so forth, selects a configuration corresponding to the set frame size from configuration information obtained from the DL broadcast signal, and attempts random access through an RAO corresponding to the selected configuration.

FIG. 10B illustrates an example of configurations for random access of a device according to an embodiment of the present disclosure.

Referring to FIG. 10B, configuration sets for random access of a device, as shown in FIG. 9B, FIG. 9C, and FIG. 10B may be shared between the device and the reception end in a preset form. In addition, according to an embodiment, the configuration sets may be periodically included in a DL broadcast signal so as to be updated or modified and shared.

The configuration sets map related configuration information to configuration indices corresponding to respective configurations. Thus, the reception end transmits a configuration index corresponding to a configuration selected for a device as configuration information to the device through a DL broadcast signal. The device also selects a configuration mapped to its MCS level or a frame size from the configuration sets stored in advance, and performs random access based on RAO information mapped to the selected configuration.

The reception end according to an embodiment of the present disclosure may obtain control information through the fixed control information region 1002 in the data transmission region as shown in FIG. 10A. The reception end then obtains at least one of an MCS level, a spreading sequence, and a packet size of data to be transmitted by the device from the control information, and decodes the data based on the obtained information. According to an embodiment of the present disclosure, the control information transmitted by the device is transmitted through one RAO, but the control information may include a different MCS level, a different spreading sequence length, a different type, and so forth for each device.

In an embodiment of the present disclosure, configuration mode indication information indicating one of two embodiments is transmitted through a DL broadcast signal, and thus the two embodiments may be used at the same time, in which the two embodiments include an embodiment (hereinbelow, an indirect select mode) where a device selects a configuration for its random access by using fixed MCS level and spreading sequence obtained based on configuration information obtained from a DL broadcast signal, for example, as shown in FIG. 9B and FIG. 9C, and an embodiment (hereinbelow, a direct select mode) where a device directly transmits its MCS level through control information based on the frame structure of FIG. 10A and the data illustrated in FIG. 10B and thus selects a configuration for random access based on a frame size or an arbitrary criterion.

Figure 11A:
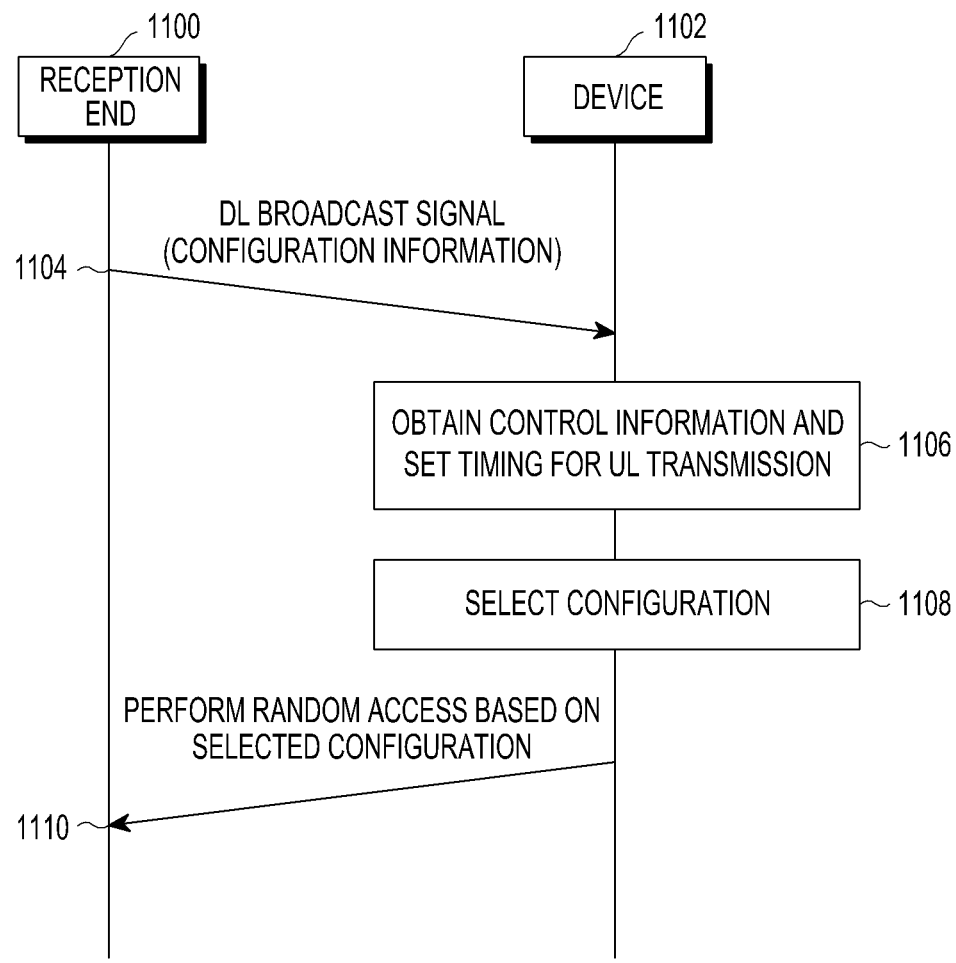
FIG. 11A is a flowchart illustrating random access operations using configuration mode indication information according to an embodiment of the present disclosure.

FIG. 11A is a flowchart illustrating random access operations using configuration mode indication information according to an embodiment of the present disclosure.

Referring to FIG. 11A, in operation 1104, a reception end 1100 sends a DL broadcast signal including configuration mode indication information to a device 1102.

In operation 1106, the device 1102 sets a timing for UL transmission based on the DL broadcast signal and obtains control information for random access from the DL broadcast signal. In operation 1108, the device 1102 identifies the mode indication information and selects a configuration for random access corresponding to the identified mode. If the mode indication information indicates the indirect select mode, the device 1102 selects a configuration corresponding to a configuration index obtained from the DL broadcast signal from a configuration set stored in advance. If the mode indication information indicates the direct select mode, the device 1102 may directly select a configuration mapped to an MCS level to be used from the configuration set based on the MCS level to be used.

In operation 1110, the device 1102 attempts random access to the reception end 1100 by using a UL resource corresponding to the selected configuration. A process of attempting random access by using the UL resource corresponding to the selected configuration includes selecting one of multiple start points obtained from the DL broadcast signal and transmitting a preamble sequence through a region corresponding to the selected start point.

Figure 11B:
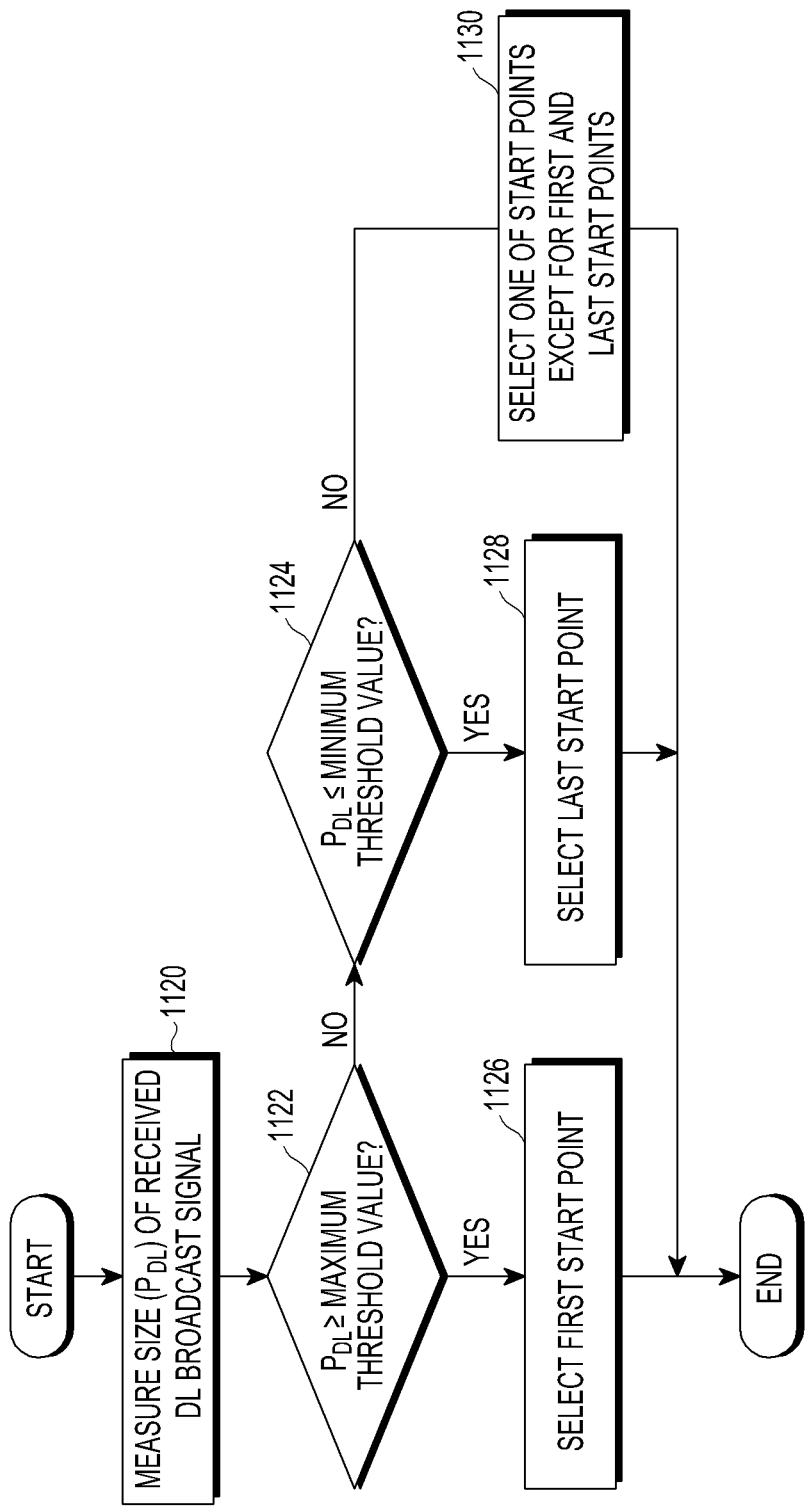
FIG. 11B is a flowchart illustrating an operation, performed by a device, of selecting a preamble sequence region according to an embodiment of the present disclosure.

FIG. 11B is a flowchart illustrating an operation, performed by a device, of selecting a preamble sequence region according to an embodiment of the present disclosure.

Referring to FIG. 11B, in operation 1120, the device receives a DL broadcast signal and measures a size of the received DL broadcast signal (PDL). The size of the DL broadcast signal may be calculated as an RTT estimation value obtained by estimation based on a timing of reception of the DL broadcast signal. The RTT estimation value may be used as a metric for selection of a preamble sequence region. More specifically, in the embodiment of FIG. 11B, it is assumed that a frame is used in which the preamble sequence region is divided into at least two partial regions and preamble sequence regions for the respective at least two devices overlap each other. In this case, to improve channel estimation performance through detection of a sequence and cancellation of interference, a device located near the reception end and satisfying a condition of a high received strength of the DL broadcast signal may select the front partial region among the partial regions divided from the preamble sequence region. Alternatively, a device located far from the reception end and having a weak received strength may select the rear partial region among the partial regions. More specifically, in operation 1122, the device determines whether the PDL is greater than or equal to a maximum threshold value of a predetermined signal strength or RTT estimation value. If determining that the PDL is greater than or equal to the maximum threshold value, the device selects a first start point from among multiple start points obtained from the DL broadcast signal in operation 1126. In this case, the device transmits a preamble sequence through the first partial region corresponding to the first start point.

If determining that the PDL is less than the maximum threshold value, the device determines whether the PDL is less than or equal to a minimum threshold value of the predetermined signal strength or RTT estimation value in operation 1124. If determining that the PDL is less than or equal to the minimum threshold value, the device selects the last start point from among the multiple start points in operation 1128. Thus, the device transmits a preamble sequence through the last partial region corresponding to the last start point among the partial regions. If determining that the PDL is greater than the minimum threshold value, the device selects one of the remaining start points among the start points other than the first start point and the last start point in operation 1130. The device then transmits the preamble sequence through the selected start point.

In hybrid automatic repeat and request (HARQ) after data transmission of each device, in an embodiment of the present disclosure, a result of reception of the data from the reception end may be received through a DL broadcast channel or a dedicated channel. First, if the reception result is received through the dedicated channel according to an embodiment, the reception result may be one-to-one (1:1) mapped to a DL resource based on a user's unique ID and a preamble sequence index and thus may be transmitted by the reception end through the DL resource. If a multiple access scheme used in a DL channel for transmission of the reception result is orthogonal frequency-division multiple access (OFDMA) or an FDMA family, a frequency and a time index of a DL resource for transmission of the reception result may be one-to-one mapped as the DL resource. If code division multiple access (CDMA) is used as the multiple access scheme, a preamble sequence used by the device or sequences shared with the reception end and a time index may be one-to-one mapped as the DL resource for transmission of the reception result. If time division multiple access (TDMA) is used as the multiple access scheme, a time index may be one-to-one mapped as the DL resource for transmission of the reception result.

According to another embodiment, information about acknowledgement (ACK) or negative ACK (NACK) may be sequentially transmitted through a predefined DL resource, together with an index of a preamble sequence selected by the device, a delay value y of a received signal, or unique ID information. The device may then determine the ACK or NACK information is intended for the device based on the unique ID received together with the information about the ACK or NACK.

If the reception result is transmitted through a DL broadcast channel, in order of an index of each received preamble sequence, a reception result of the sequence may be transmitted in the form of a bitmap configured with bits corresponding to ACK or NACK. In this case, ACK is indicated by 1 and NACK is indicated by 0. For preamble sequences that are not actually used, 0 corresponding to NACK is mapped. The bitmap of the reception result may be configured for each RAO, assuming that one RAO uses one preamble sequence set according to an embodiment. For one or more RAOs, one bitmap may be configured.

FIG. 11C illustrates an example of a bitmap configuration according to an embodiment of the present disclosure.

Referring to FIG. 11C, a bitmap broadcast from the reception end with respect to reception results of devices is shown and activity states of the devices mapped to respective bits of the bitmap, that is, whether to transmit data or not, are indicated by On/Off. A sequence index mapped to each bit of the bitmap is an index of a preamble sequence. Thus, it can be seen from FIG. 11C that preamble sequences corresponding to indices 1, 3, 4, 6, and 10 have been received through one RAO and data transmitted by a device using the indices 1, 4, and 10 have been successfully received by the reception end. It means that data transmitted by a device using the other indices fails to be received.

According to an embodiment, if a reception result is not received from the reception end during a predetermined response time after data transmission, a device regards its reception result as a failure and performs data retransmission.

According to another embodiment of the present disclosure, considering an RTT delay and a maximum delay spread in a frame structure in an asynchronous environment, an additional guard time period in addition to guard time may be arranged between a preamble sequence region and each data transmission region. The device then transmits data, taking a random delay corresponding to the additional guard time period after the preamble sequence region into account.

Figure 12:
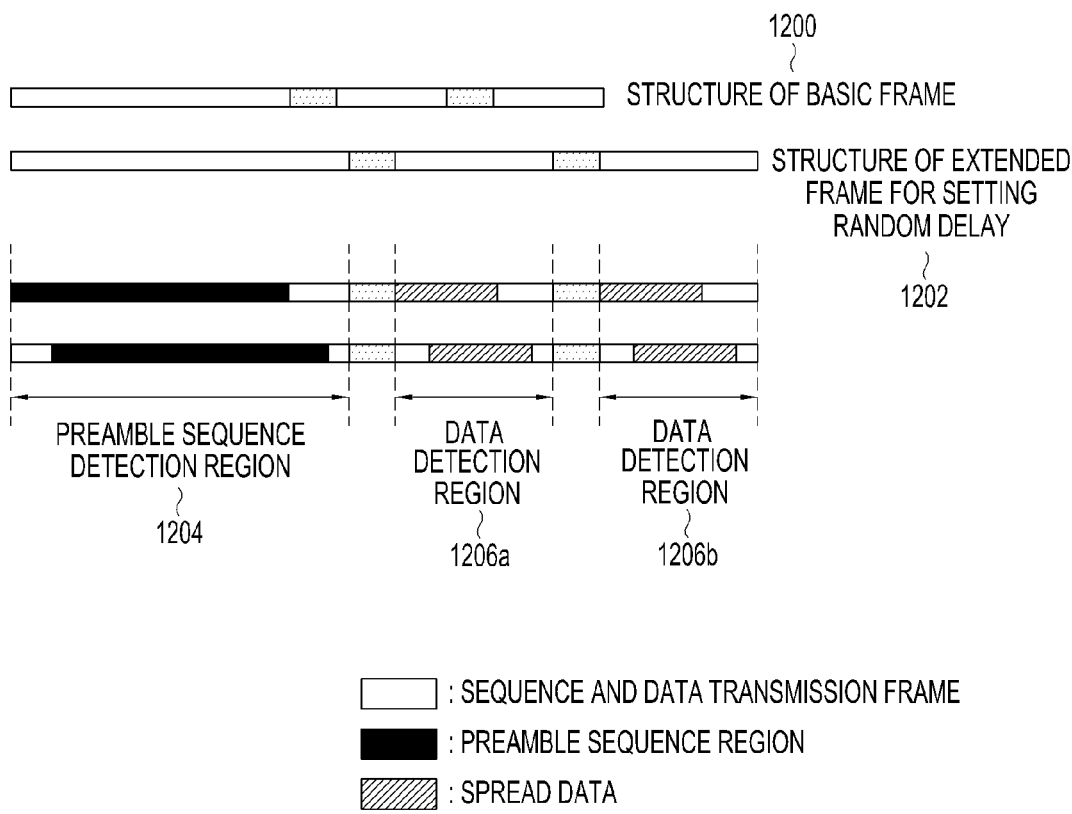
FIG. 12 illustrates an example of a frame structure in which a time period for arbitrary delay is set between a preamble sequence period and a data transmission period in a UL synchronous environment according to an embodiment of the present disclosure.

FIG. 12 illustrates an example of a frame structure in which a time period for arbitrary delay is set between a preamble sequence period and a data transmission period in a UL synchronous environment according to an embodiment of the present disclosure.

Referring to FIG. 12, it is assumed that an additional guard time for a random delay is set for a basic frame 1200. Then, in a frame in which the additional guard time is set (hereinafter, referred to as an extended frame 1202), as the additional guard time is applied to the preamble sequence region and the data transmission region of the basic frame 1200, the size of each of the preamble sequence region and the data transmission region is extended. In this case, it is assumed that at least two devices use an identical preamble sequence. If so, the additional guard time is not necessarily positioned in a zero-padding region, and according to an embodiment, the additional guard time may be arranged at random in the preamble sequence region and the data transmission region. Thus, the preamble sequence region may be arranged differently for a different path in a frame period corresponding to a preamble sequence detection region 1204. For example, in a third path, the additional guard time is applied immediately in front of the start of the zero-padding region, and in a fourth path, the additional guard time is applied to the front partial region and the rear partial region of the preamble sequence region. Likewise, data is detected through different parts of data detection regions 1026a and 1026b for each path through additional guard times arranged at random in the data detection regions 1026a and 1026b.

When devices use an identical preamble sequence through random arrangement of additional guard times, a preamble sequence may be detected without collision and channel estimation may be performed based on the preamble sequence detection. Similarly, for a data transmission region, even when the devices use an identical spreading sequence, data may be detected without collision based on random arrangement of the additional guard times. The random arrangement of the additional guard times may be applied for delivery of information to each device according to an embodiment, and the use thereof is not limited. Thus, additional guard time related information indicating a size of an additional guard time or the number of samples available in an RAO may be included in configuration information included in a DL broadcast signal. The device then selects an arbitrary delay value within a given maximum arbitrary delay value based on the additional guard time related information and transmits a preamble sequence, and also applies an identical delay in a data region for data transmission.

Meanwhile, in embodiments of the present disclosure, a zero-padding region is used to cancel interference for detection of a preamble sequence and data. The use of the zero-padding region increases complexity caused by an increase in an observation region of the reception end, and also degrades resource use efficiency. Therefore, another embodiment of the present disclosure proposes a frame structure from which the zero-padding region is removed.

Figure 13A:
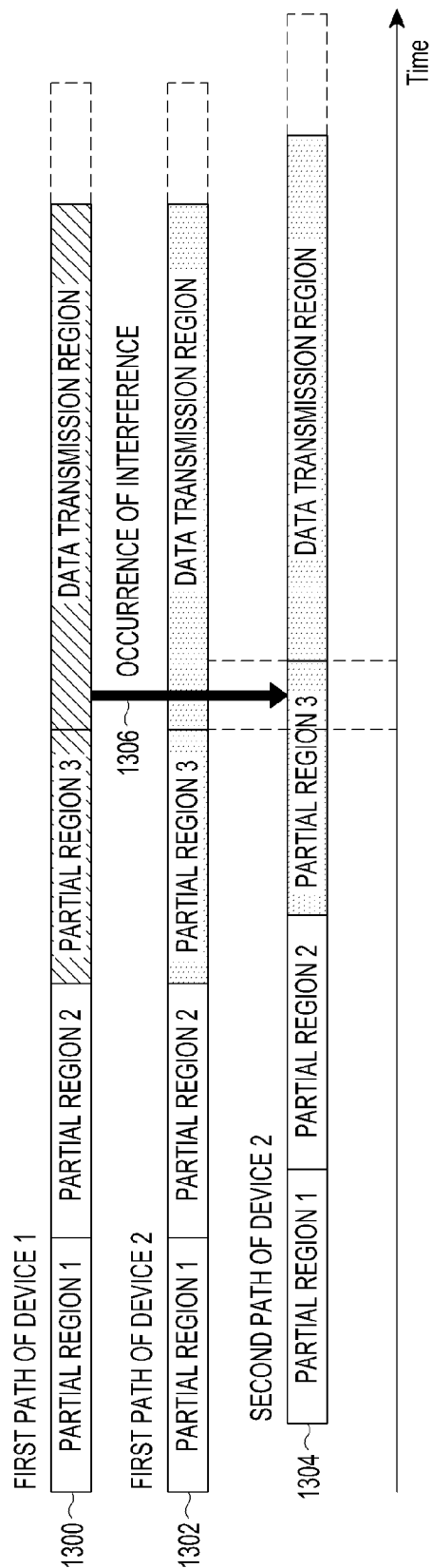
FIG. 13A illustrates an example of an interference condition occurring due to a frame structure from which a zero-padding region is removed according to an embodiment of the present disclosure.

FIG. 13A illustrates an example of an interference condition occurring due to a frame structure from which a zero-padding region is removed according to an embodiment of the present disclosure.

Referring to FIG. 13A, for convenience, two devices are assumed to use two paths and a UL synchronous condition is assumed. A preamble sequence region is divided into, for example, a total of three partial regions, and there is no zero-padding region between the preamble sequence region and a data transmission region. Each of a device 1 and a device 2 transmits a preamble sequence through a partial region 3 in a first path 1300 and 1302. At this time, a preamble sequence is also transmitted through the partial region 3 in a second path of the device 2 1304. In this case, a data transmission region of the second path of the device 2 1304 overlaps the data transmission regions of the first paths of the device 1 and the device 2 1300 and 1302, such that interference occurs as indicated by 1306. Although not shown, the data transmission region of the first path of the device 2 also overlaps the data transmission regions of the first path of the device 1 and the device 2, such that interference may occur. Thus, in an embodiment of the present disclosure, for a device that accesses a partial region where such an overlapping situation may occur, the device may shift a preamble sequence to avoid interference.

Figure 13B:
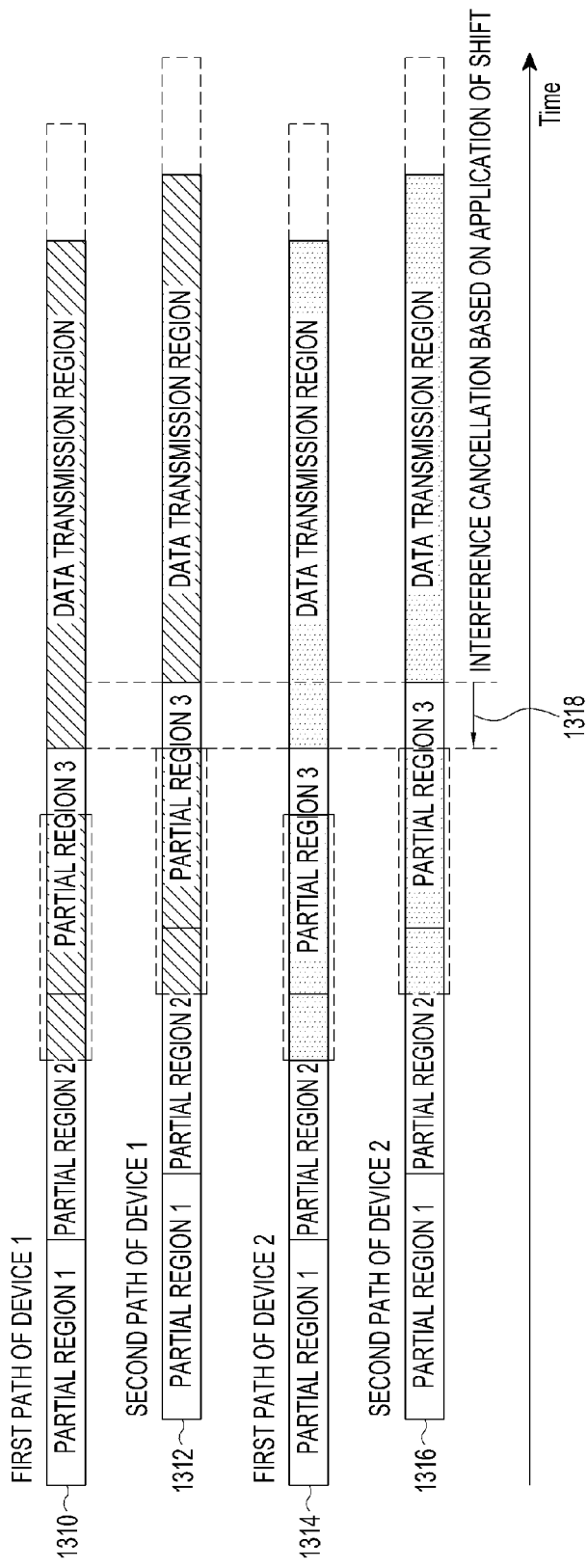
FIG. 13B illustrates an example of a frame structure to which sequence shift is applied according to an embodiment of the present disclosure.

FIG. 13B illustrates an example of a frame structure to which sequence shift is applied according to an embodiment of the present disclosure.

Referring to FIG. 13B, for example, two devices use two paths. It is assumed that in a UL synchronous situation, each of the devices transmits a preamble sequence through a partial region 3 among three partial regions divided from a preamble sequence region for each path. In FIG. 13, by shifting a preamble sequence as much as a time period 1318, interference with a data transmission region may be cancelled. The time period 1318 corresponds to a maximum delay spread obtained from a DL broadcast signal. More specifically, as a transmission period of a preamble sequence is shifted by the time period 1318 to the left from the partial region 3 in both the first path 1310 and 1314 and the second path 1312 and 1316 of each of the device 1 and the device 2, a guard interval corresponding to the time period 1318 is generated, thereby cancelling interference with the data transmission region.

If a delay that may occur due to a maximum delay spread, an RTT, etc., exceeds a maximum threshold value corresponding to the length of the preamble sequence, referring to FIG. 13B, the preamble sequence in the partial region 3 to which sequence shift is applied is transmitted with an extended overlapping region thereof with the partial region 2. In this case, the effect of increasing the number of devices that transmit the preamble sequence through the partial region 2 may be obtained. As a result, the performance of channel estimation performed by the reception end may degrade. Thus, application of sequence shift according to an embodiment of the present disclosure may be possible when the length of the preamble sequence is sufficiently longer than a delay that may occur due to a maximum delay spread, an RTT, etc.

Consequently, in an asynchronous situation where a long RTT is consumed to support a wide coverage, the sequence shift may be difficult to apply. Thus, according to an embodiment of the present disclosure, in an asynchronous environment, a received strength of a DL broadcast signal is compared with a predetermined threshold value. If the received strength is less than the threshold value, a sequence shift restrict mode may be set in which the preamble sequence is transmitted through a region other than the partial region 3.

Figure 13C:
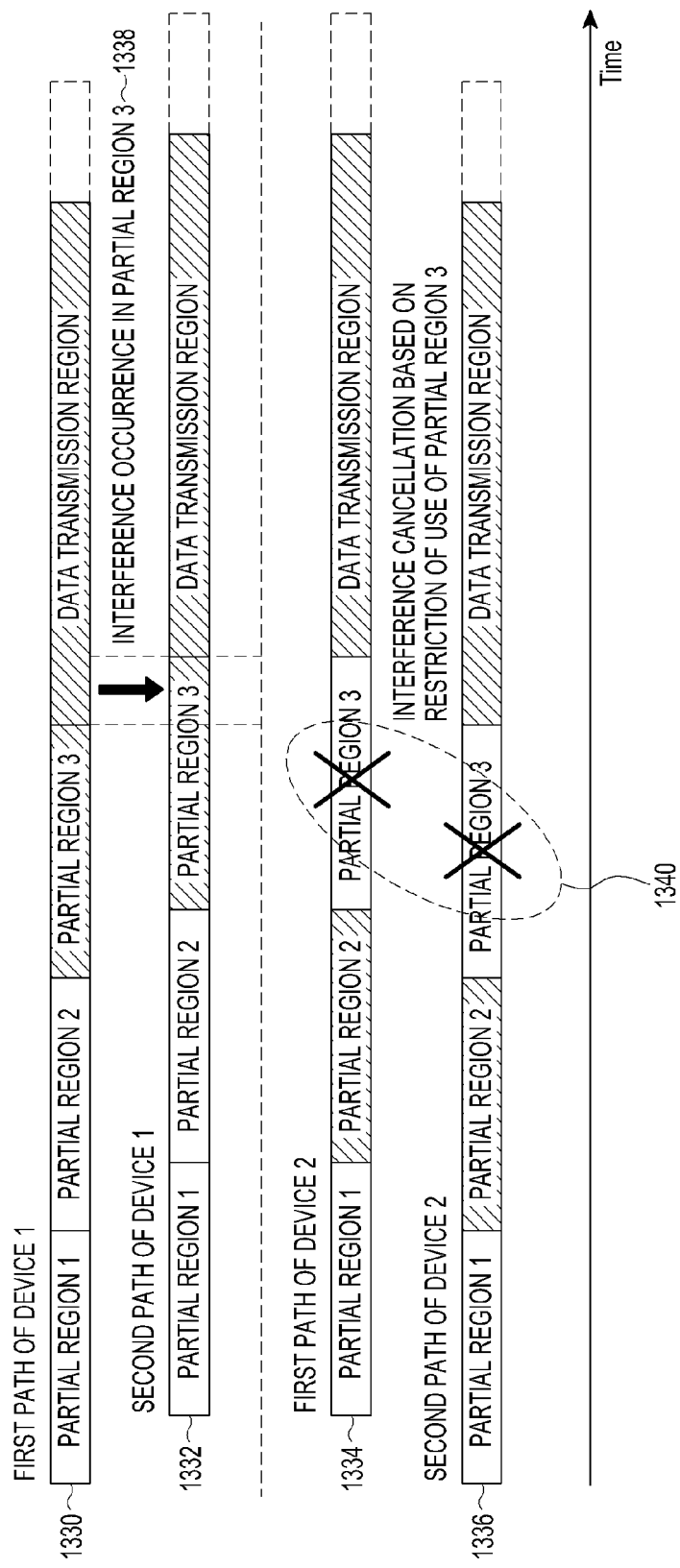
FIG. 13C illustrates an example of an operation when a sequence shift restrict mode is set according to an embodiment of the present disclosure.

FIG. 13C illustrates an example of an operation when a sequence shift restrict mode is set according to an embodiment of the present disclosure.

Referring to FIG. 13C, for example, it is assumed that each of two devices uses two multi-paths 1330 and 1332, and 1334 and 1336, and a device 1 selects a partial region 3 as a preamble sequence region. A device 2 is assumed to receive a DL broadcast signal from a reception end and to determine that a measured received strength is less than a predetermined threshold value. Herein, the threshold value corresponds to the minimum threshold value described with reference to FIG. 11B. The device 2 then selects a region other than the partial region 3 1340 corresponding to the last partial region of the preamble sequence region. Referring to FIG. 13C, as the device 2 transmits a preamble sequence through the partial region 2 in each of a first path and a second path, it is possible to cancel interference that may occur in case of application of sequence shift to the partial region 3 of the device 1 when the preamble sequence is transmitted by the device 2 through the partial region 3.

Thus, for a device operating based on a frame structure from which a zero-padding region is removed as shown in FIGS. 13B and 13C, the reception end according to an embodiment of the present disclosure transmits frame mode indication information indicating the frame structure from which the zero-padding region is removed as configuration information through a DL broadcast signal. The device then identifies the frame mode indication information obtained from the DL broadcast signal to determine whether a frame format of the device is a frame from which the zero-padding region is removed, and operates correspondingly.

Figure 14:
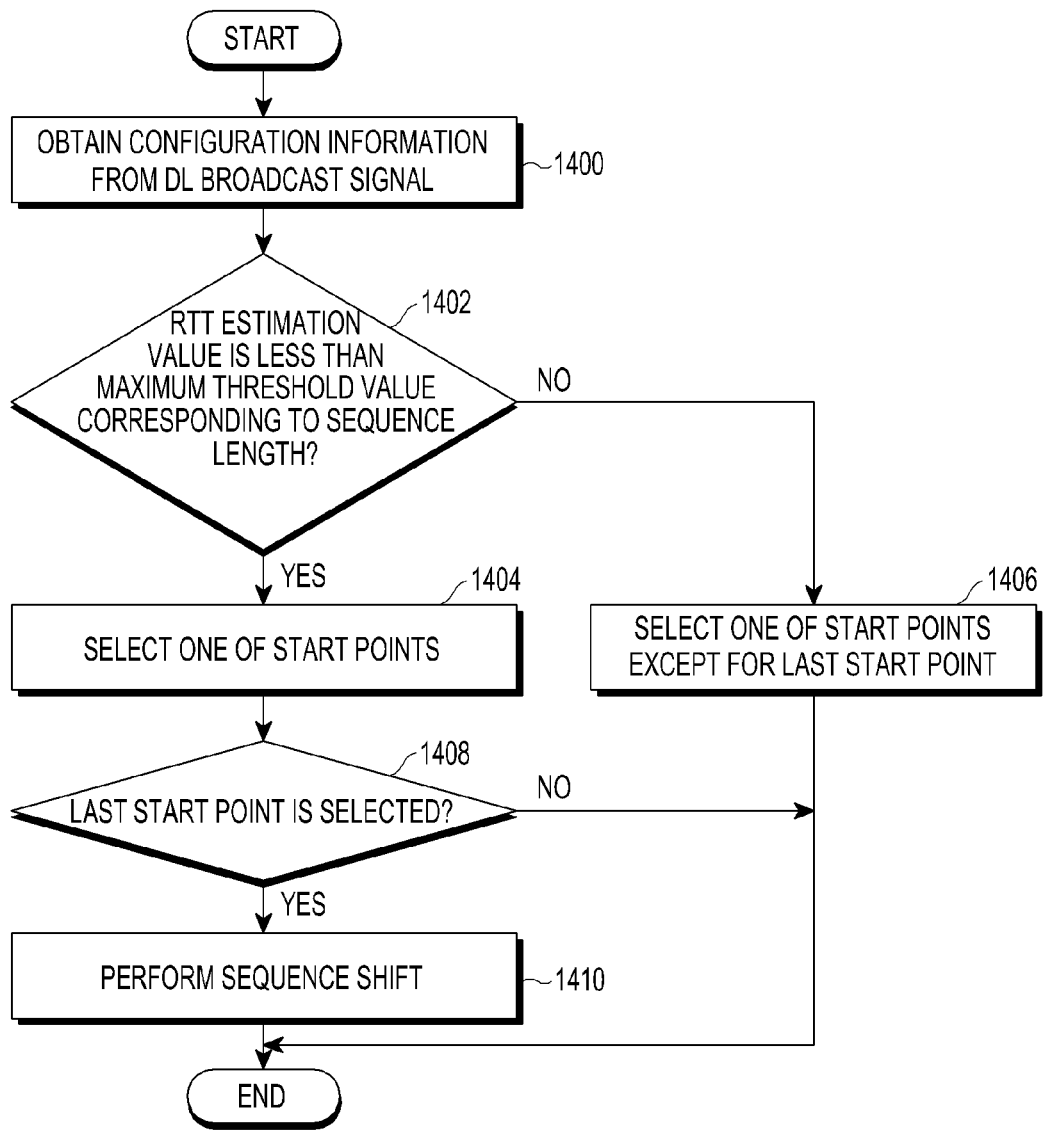
FIG. 14 is a flowchart of an example of an operation, performed by a device operating based on a frame structure from which a zero-padding region is removed according to an embodiment of the present disclosure.

FIG. 14 is a flowchart of an example of an operation, performed by a device operating based on a frame structure from which a zero-padding region is removed according to an embodiment of the present disclosure.

Referring to FIG. 14, in operation 1400, the device receives a DL broadcast signal further including frame mode indication information as configuration information according to an embodiment of the present disclosure. For example, the device may determine, from the frame mode indication information included in the configuration information, a mode where a frame structure from which a zero-padding region is removed is used. The device measures a received strength of the DL broadcast signal. For example, the device may measure an RTT based on a reception timing of the DL broadcast signal or a strength of the DL broadcast signal. Then, in operation 1402, the device determines whether an estimation value of the RTT is less than a particular threshold value obtained from the configuration information to determine whether to apply sequence shift. The particular threshold value is less than an absolute value obtained from the sequence length, and may be set as a system parameter. For example, it is assumed that the sequence length is 600 samples and a bandwidth BW set for transmission of the device is 3.75 kHz. If the maximum threshold value is set to 0.5 of the sequence length, an absolute time corresponding to the sequence length may be obtained as a result of dividing the sequence length by the bandwidth, i.e., 600/3750*0.5. Herein, the bandwidth may be obtained by the UE through resource information allocated thereto from the base station for data transmission or may be previously set. If the estimation value of the RTT is greater than or equal to the maximum threshold value corresponding to the sequence length, the device selects a start point from among multiple start points obtained from the configuration information except for the last start point in operation 1406, and terminates the process.

If the estimation value of the RTT is less than the maximum threshold value corresponding to the sequence length, the device selects a start point from among multiple start points obtained from the configuration information in operation 1404. In operation 1408, the device determines whether the selected start point is the last start point. If the selected start point is not the last start point, the device terminates the process. If the selected start point is the last start point, the device shifts the sequence from the selected partial region to the left by a time period corresponding to a maximum delay spread obtained from the configuration information, thereby performing sequence shift in operation 1410. As such, according to an embodiment of the present disclosure, the device adaptively selects its preamble sequence region by using configuration information received from a DL broadcast signal, a received signal strength the device may indirectly estimate using the DL broadcast signal, an RTT, and so forth, and applies sequence shift for interference cancellation.

Meanwhile, as the reception end according to an embodiment of the present disclosure detects a preamble sequence for a plurality of devices, if synchronization is not achieved in preamble sequence detection, reception timings of the preamble sequence may differ from device to device. Thus, the reception end needs to set a range for preamble sequence detection, based on differences between reception timings of a preamble sequence of devices.

Figure 15A:
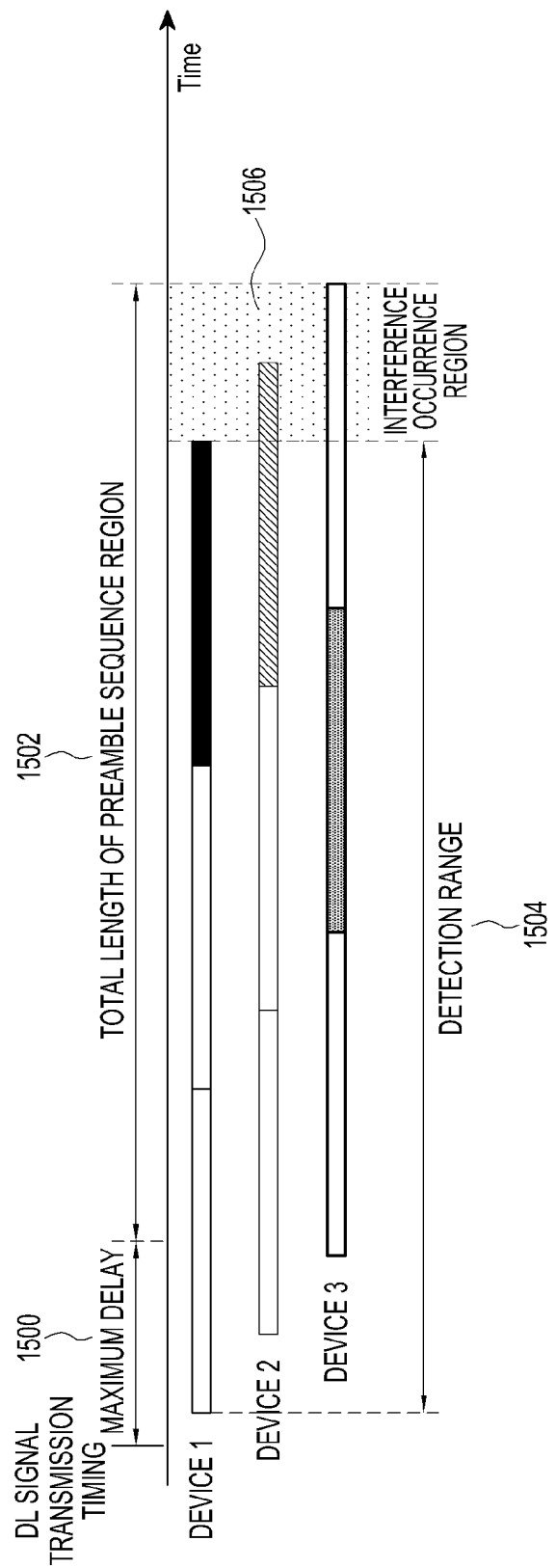
FIG. 15A illustrates an example when a detection range of a preamble sequence region is set in an asynchronous condition according to an embodiment of the present disclosure.

FIG. 15A illustrates an example when a detection range of a preamble sequence region is set in an asynchronous condition according to an embodiment of the present disclosure.

Referring to FIG. 15A, it is assumed that the reception end receives a preamble sequence through a total of three devices. Herein, a maximum delay 1500 is assumed to be set based on a maximum delay spread and a maximum value of an RTT measured based on a service coverage.

In a synchronous environment for UL reception, a device located closer to the reception end may have a stronger received strength of a preamble sequence and may be detected first. Thus, in an embodiment of the present disclosure, a detection range 1504 of the preamble sequence region is set to a range corresponding to a total length 1502 of the preamble sequence region from the partial region 3, that is the preamble sequence region of the device detected first, i.e., the device 1. Thus, the preamble sequence may be detected while removing samples contaminated from an interference region 1506. Herein, interference from the interference region 1506 occurs due to a preamble sequence or data received from other devices. In the embodiment of FIG. 15A if interference control fails to be completely performed by application of sequence shift or adaptive selection of a preamble sequence region, channel estimation is performed after removal of interference samples caused by additionally received data, thereby controlling an influence of interference.

Figure 15B:
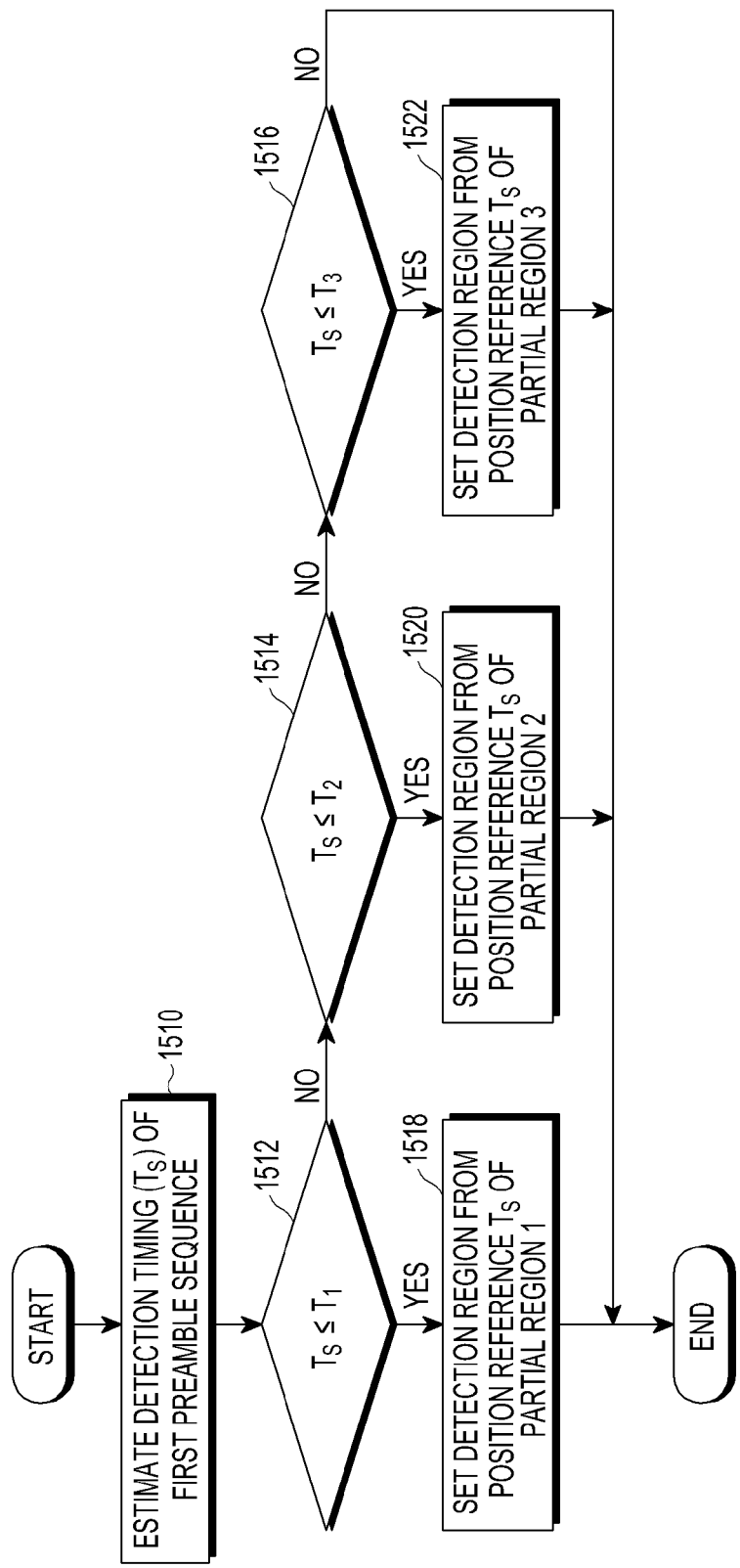
FIG. 15B is a flowchart of an example of an operation, performed by a reception end, of setting a detection range for a preamble sequence according to an embodiment of the present disclosure.

FIG. 15B is a flowchart of an example of an operation, performed by a reception end, of setting a detection range for a preamble sequence according to an embodiment of the present disclosure. For convenience, the preamble sequence region is assumed to be divided into a total of three partial regions.

Referring to FIG. 15B, in operation 1510, the reception end estimates a detection timing $T_S$ of a preamble sequence received first. In operation 1512, the reception end compares the detection timing with a detection timing $T_1$ of a partial region 1. If the detection timing $T_S$ precedes or coincides with (is less than or equal to) the detection timing $T_1$ of the partial region 1, the reception end determines that the preamble sequence is received through the partial region 1 and determines a region corresponding to a total length of the preamble sequence region from the timing $T_S$ as a detection range in operation 1518.

If it is determined that the detection timing $T_S$ follows (exceeds) the detection timing $T_1$ of the partial region 1 in operation 1512, the reception end compares the timing $T_S$ with a detection timing $T_2$ of the partial region 2 in operation 1514. If the detection timing $T_S$ precedes or coincides with (is less than or equal to) the detection timing $T_2$ of the partial region 2, the reception end determines that the preamble sequence is received through the partial region 2 and determines a region corresponding to a total length of the preamble sequence region from the timing $T_S$ as a detection range in operation 1520.

If it is determined that the detection timing $T_S$ follows (exceeds) the detection timing $T_2$ of the partial region 2 in operation 1514, the reception end compares the timing $T_S$ with a detection timing $T_3$ of the partial region 3 in operation 1516. If the detection timing $T_S$ precedes or coincides with (is less than or equal to) the detection timing $T_3$ of the partial region 3, the reception end determines that the preamble sequence is received through the partial region 3 and determines a region corresponding to a total length of the preamble sequence region from the timing $T_S$ as a detection range in operation 1522. If it is determined that the detection timing $T_S$ follows (exceeds) the detection timing $T_3$ of the partial region 3 in operation 1516, the reception end regards a signal sent from the devices as failing to be received, and terminates the operation of FIG. 15B.

Figure 15C:
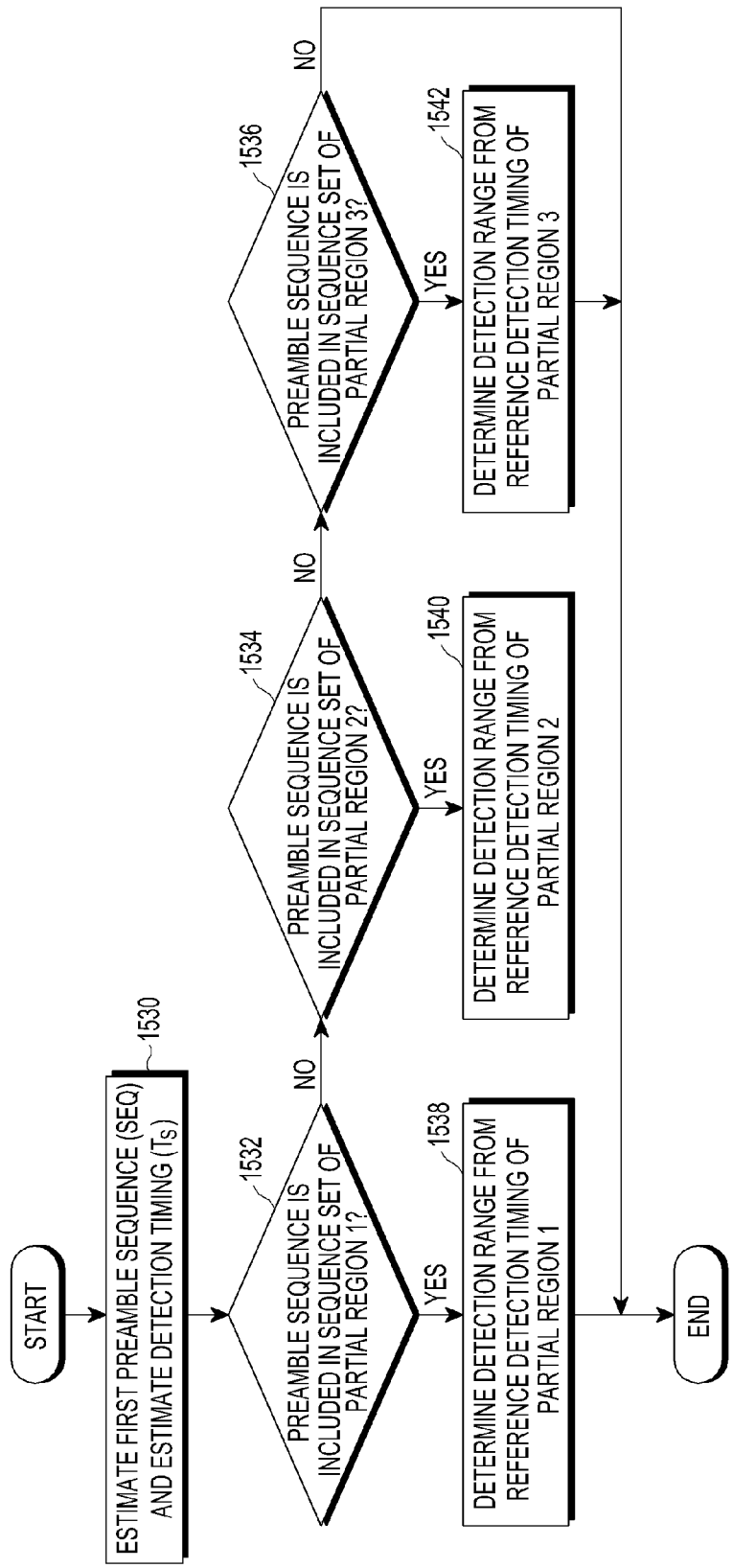
FIG. 15C is a flowchart of an example of an operation, performed by a reception end, of setting a detection range for a preamble sequence according to an embodiment of the present disclosure.

FIG. 15C is a flowchart of an example of an operation, performed by a reception end, of setting a detection range for a preamble sequence according to an embodiment of the present disclosure. For convenience, the preamble sequence region is assumed to be divided into a total of three partial regions. It is also assumed that different sequence sets are used for different partial regions.

Referring to FIG. 15C, in operation 1530, the reception end estimates a first received preamble sequence a detection timing $T_S$ of the preamble sequence. Herein, the reception end stores in advance a sequence set mapped to each partial region. Thus, the reception end may identify a sequence set including the first received preamble sequence and identify a partial region mapped to the identified sequence set. More specifically, in operation 1532, the reception end determines whether the preamble sequence is a sequence included in a sequence set C1 of the partial region 1. If determining that the preamble sequence is included in the sequence set C1 of the partial region 1, the reception end determines a region corresponding to a total length of the preamble sequence region from a reference detection timing corresponding to the position of the partial region 1 as a detection range in operation 1538.

If determining that the preamble sequence is not included in the sequence set C1 of the partial region 1 in operation 1532, the reception end proceeds to operation 1534. In operation 1534, the reception end determines whether the preamble sequence is a sequence included in a sequence set C2 of the partial region 2. If determining that the preamble sequence is included in the sequence set C2 of the partial region 2, the reception end determines a region corresponding to a total length of the preamble sequence region from a reference detection timing corresponding to the position of the partial region 2 as a detection range in operation 1540.

If determining that the preamble sequence is not included in the sequence set C1 of the partial region 2 in operation 1534, the reception end proceeds to operation 1536. In operation 1536, the reception end determines whether the preamble sequence is a sequence included in a sequence set C3 of the partial region 3. If determining that the preamble sequence is included in the sequence set C3 of the partial region 3, the reception end determines a region corresponding to a total length of the preamble sequence region from a reference detection timing corresponding to the position of the partial region 3 as a detection range in operation 1542.

A basic operation process of the reception end in a general compressed sensing-based random access scheme includes detecting active devices through preamble sequence detection and estimating a channel of the detected active devices. Thereafter, the reception end detects data transmitted by the active devices by using the estimated channel. As each device spreads and transmits a data symbol by using a different spreading sequence, the reception end may receive overlapping signals. Thus, the reception end may perform multi-user detection (MUD) by using a preamble sequence used by each device from received data samples and the estimated channel. The reception end previously stores spreading sequences mapped to preamble sequences, respectively. Thus, by detecting a preamble sequence, the reception end may obtain the spreading sequence mapped to the preamble sequence.

The MUD of the reception end may use existing various reception schemes, for example, zero-forcing, a minimum mean square error (MMSE), and so forth. Related information such as the number of spreading sequences used for data transmission for each device, a length of each spreading sequence, and so forth may be defined as parameters in a configuration set for random access as shown in FIG. 9B and FIG. 9C described above. Likewise, the related information may be delivered to a device as configuration information through a DL broadcast signal or may be used as a fixed value in a system.

In a compressed sensing based random access operation, it is assumed that a smaller number of devices than devices designed and supportable in a system attempt access. In this case, in an embodiment of the present disclosure, after channel estimation with respect to devices attempting access, data is detected using some of data samples received in data detection, thereby reducing complexity.

Figure 16A:
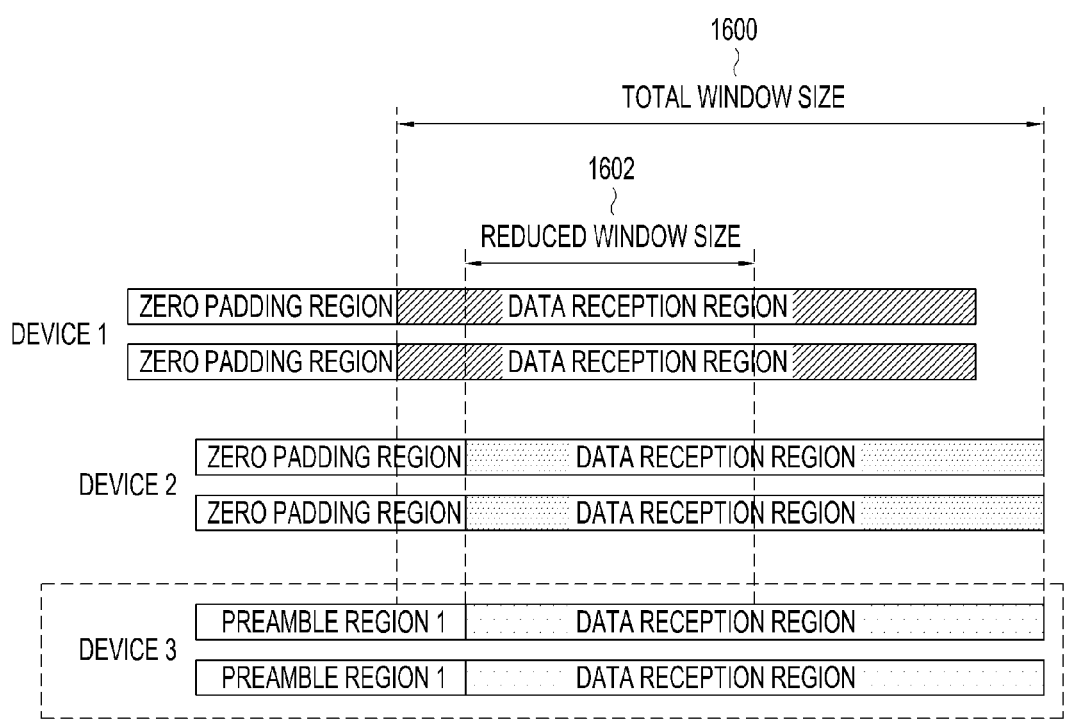
FIG. 16A illustrates an example of a method for setting a detection window to reduce complexity of multi-user detection (MUD) according to an embodiment of the present disclosure.

FIG. 16A illustrates an example of a method for setting a detection window to reduce complexity of MUD detection according to an embodiment of the present disclosure.

Referring to FIG. 16A, for example, it is assumed that a total of three devices perform random access to a reception end at the same time through two paths. In this case, an embodiment of the present disclosure detects data samples received in a reduced window size 1602 smaller than an entire window size 1600 including all data reception regions through all paths of the devices the devices.

Figure 16B:
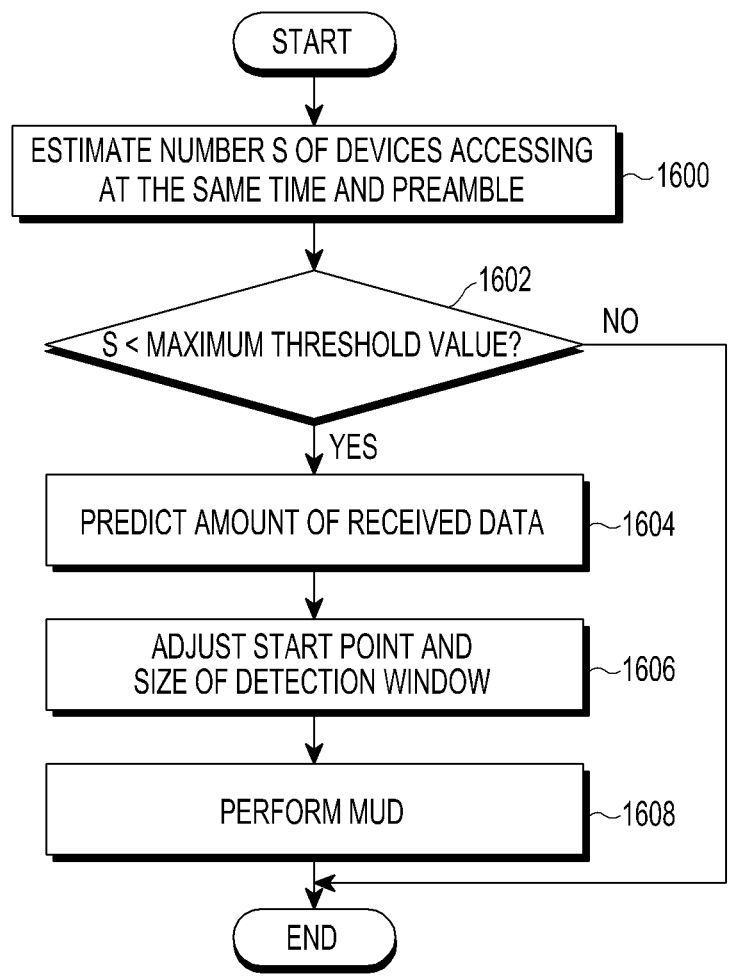
FIG. 16B is a flowchart of an example of an operation, performed by a reception end, of detecting received data samples in a reduced window size according to an embodiment of the present disclosure.

FIG. 16B is a flowchart of an example of an operation, performed by a reception end, of detecting received data samples in a reduced window size according to an embodiment of the present disclosure.

Referring to FIG. 16B, in operation 1600, the reception end estimates the number of active devices, S, that perform random access at the same time and estimates a channel of the detected active devices. In operation 1602, the reception end determines whether the number of active devices is less than a maximum number set on a system. If determining that the number of active devices is equal to or greater than the maximum number set on the system in operation 1602, the reception end terminates the operation of FIG. 16.

If determining that the number of active devices is less than the maximum number set on the system in operation 1602, the reception end predicts a total amount of data to be received from the active devices in operation 1604. In operation 1606, the reception end adjusts a start point and a size of a data window to correspond to the predicted total amount of data. In operation 1608, the reception end performs MUD that performs data detection based on the reduced window size. More specifically, it is assumed that the number of active devices that are accessible at the same time on the system is 3, the number of data symbols transmitted by each device is 10, and a sequence length is identically 30. In this case, if the three devices perform access at the same time, the reception end may detect a total of thirty data symbols. In this case, if only two active devices actually perform access and twenty data symbols are transmitted through the devices, the reception end may perform data detection when there are twenty or more data samples. Therefore, in an embodiment of the present disclosure, MUD is performed using a reduced window size corresponding to the twenty data symbols instead of the entire window size corresponding to the thirty data symbols. A start point of the reduced-size window may be determined in terms of optimization of reception performance according to an embodiment. For example, the start point of the reduced-size window may be a data reception point in time of one of actually accessing active devices, or may be a value between data reception points in time of the active devices.

Adjustment of a data detection window size according to an embodiment of the present disclosure may be used to remove a guard time between spreading sequences or a zero-padding region when multiple spreading sequences are used in a data transmission region of a frame.

Figure 17:
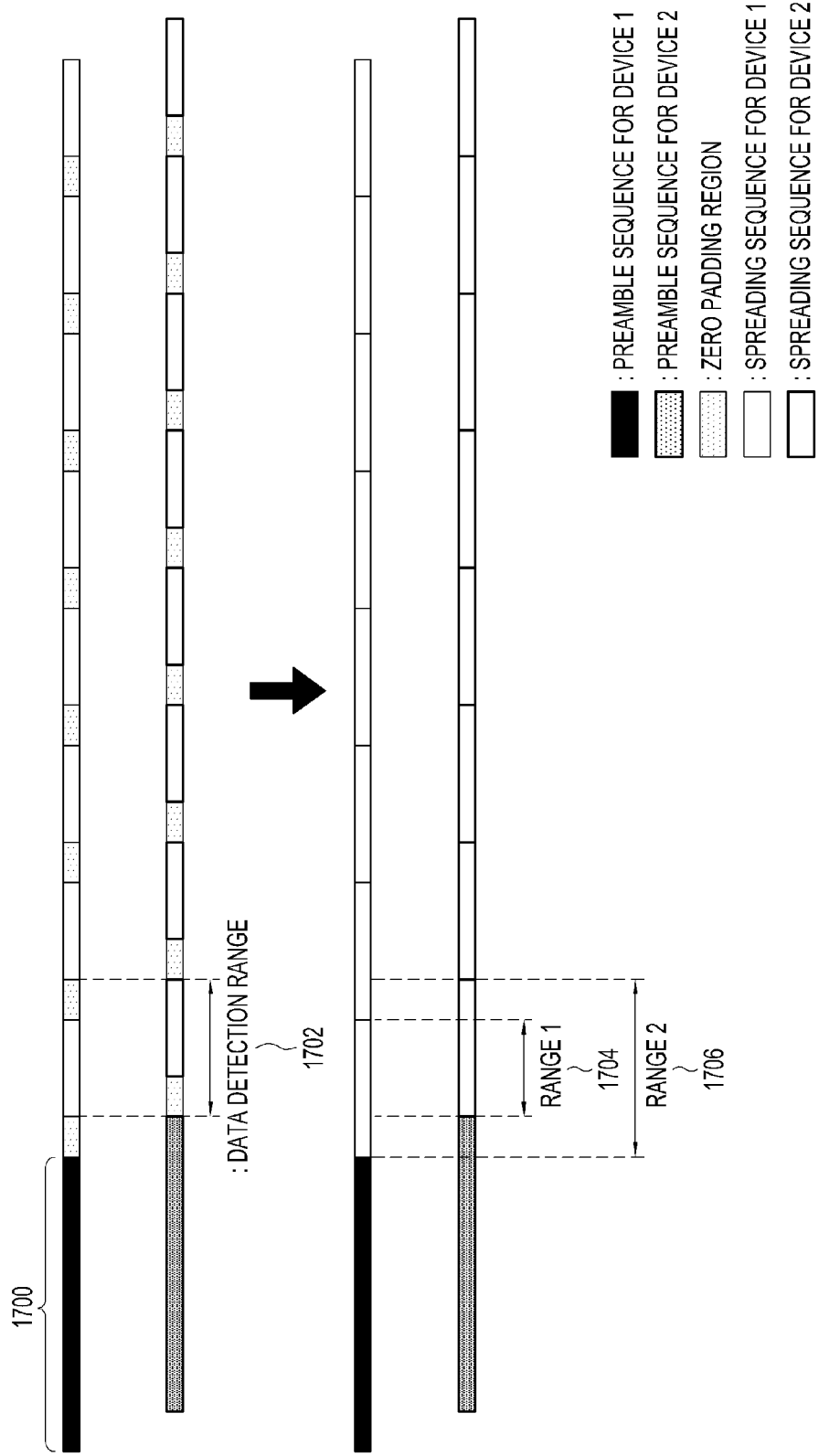
FIG. 17 illustrates an example where a data detection window size is controlled to remove a guard time or zero-padding region between spreading sequences according to an embodiment of the present disclosure.

FIG. 17 illustrates an example where a data detection window size is controlled to remove a guard time or zero-padding region between spreading sequences according to an embodiment of the present disclosure.

Referring to FIG. 17, a region including a guard time after a preamble sequence region 1700 and a data transmission region may be set as a data detection range 1702, or a region including a guard time between data detection regions and a data detection region may be set as the data detection range 1702. On the other hand, in an embodiment of the present disclosure, as shown in a third path, spreading sequences may be disposed after a preamble sequence region of the device 1, without a guard time region. Instead, a region of the spreading sequences has a length including a guard time region in addition to an existing data transmission region. Alternatively, a region of spreading sequences corresponding to a length reduced by a guard time region may be set. In this case, by using a range 1 1704 and a range 2 1706 shown in FIG. 17 in addition to an existing method of setting a data detection range based on a guard time region, a data detection range may be set.

For the range 1 1704, samples except for interference samples from a preamble sequence or other adjacent spreading sequences are used for decoding. When the range 1 1704 is used, an actual delay between devices is calculated and a data detection region is set based on the calculated delay, thereby reducing overhead and improving reception performance in relation to the guard time.

Meanwhile, when the range 2 1706 is used, robustness against interference is sufficiently secured due to the length of the spreading sequence increased by the guard time, thereby decoding data samples including samples containing interference. Moreover, by calculating a delay between devices based on preamble sequences, a data detection range may be set such that interference samples fall within a range to a proper extent or lower.

Figure 18:
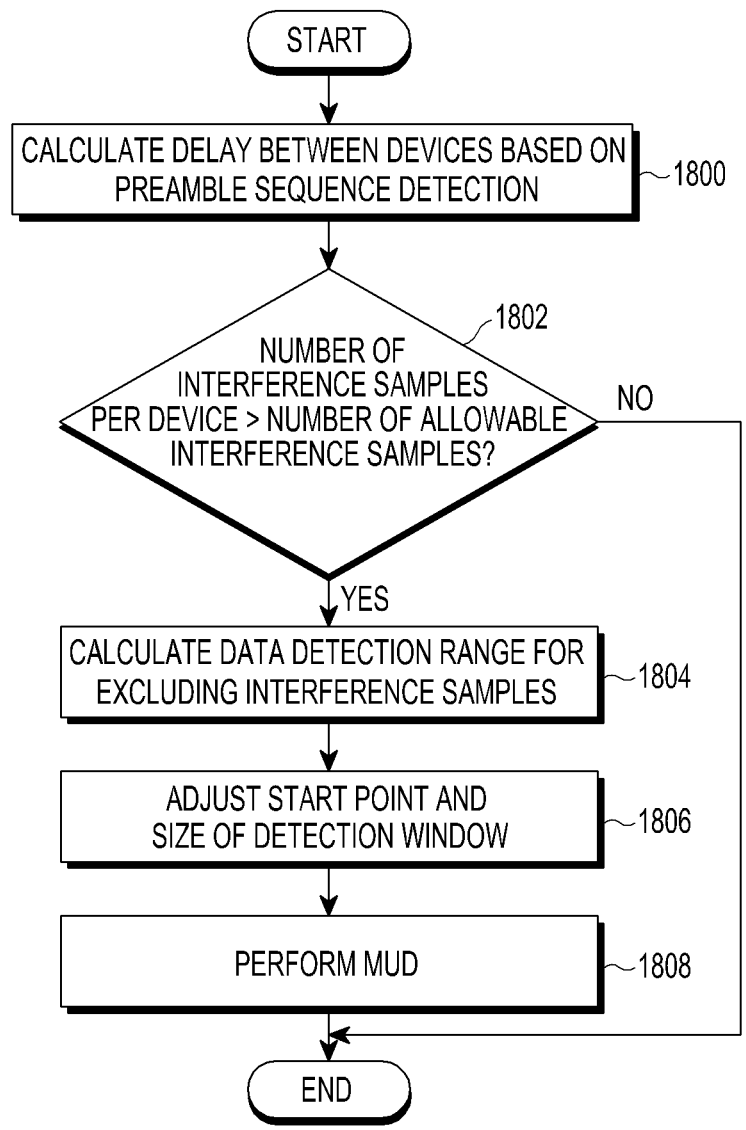
FIG. 18 illustrates an example of an operation, performed by a reception end, of setting a data detection range to reduce overhead caused by a guard time region according to an embodiment of the present disclosure.

FIG. 18 illustrates an example of an operation, performed by a reception end, of setting a data detection range to reduce overhead caused by a guard time region according to an embodiment of the present disclosure.

Referring to FIG. 18, in operation 1800, the reception end calculates a delay between devices based on preamble sequence detection. In operation 1802, the reception end determines whether the number of interference samples for each device predicted based on the calculated delay exceeds a maximum number of interference samples, which is allowed for securing the performance of data detection and is set for system designing. The maximum number of interference samples allowed is used as one criterion related to data decoding performance, but may also be replaced with another metric depending on an embodiment. If determining that the number of interference samples is less than or equal to the maximum number of interference samples allowed, the reception end terminates the operation of FIG. 18.

If determining that the number of interference samples exceeds the maximum number of interference samples allowed, the reception end calculates a data detection range based on the number of interference samples for each device in operation 1804. The reception end adjusts a start point and a size of a detection window corresponding to the calculated data detection range in operation 1806 and performs MUD based on the detected start point and size of the detection window in operation 1808.

Figure 19:
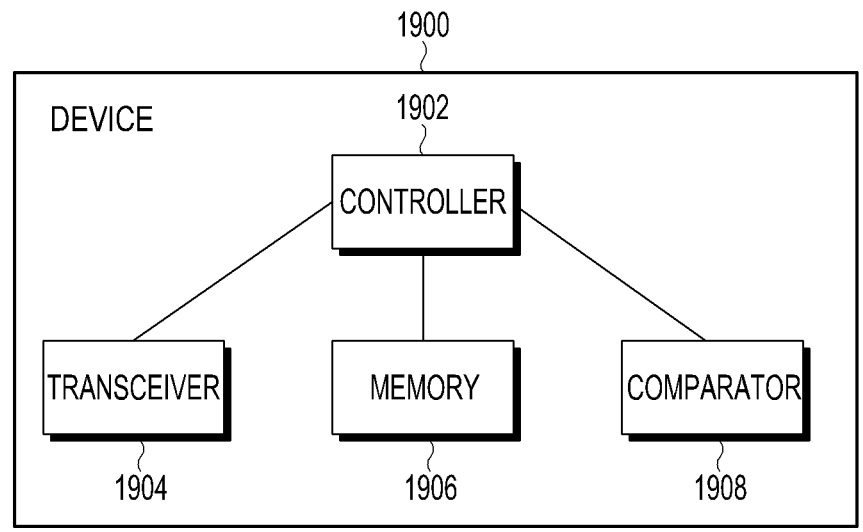
FIG. 19 is a block diagram of a device according to an embodiment of the present disclosure.

FIG. 19 is a block diagram of a device according to an embodiment of the present disclosure.

Referring to FIG. 19, a device 1900 may include a controller (e.g., a processor) 1902, a transceiver 1904, a memory 1906, and a comparator 1908. The structure of the device 1900 may be divided into detailed structures or integrated into one structure depending on an embodiment or operator's intention.

The memory 1906 stores information about configuration sets corresponding to FIGS. 9B, 9C, and 10B, sequence sets for preamble sequences, and spreading sequences mapped thereto. In the above-described embodiments of the specification, the memory 1906 stores all information stored in advance by the device.

The transceiver 1904 receives a DL broadcast signal according to the above-described embodiments, and transmits preamble sequences, data, etc., in a region under control of the controller 1902.

The controller 1902 controls an overall operation of the device in the above-described embodiments. The comparator 1908 performs comparison and determination performed by the device in the above-described embodiments under control of the controller 1902. A detailed operation of each component will be omitted.

Figure 20:
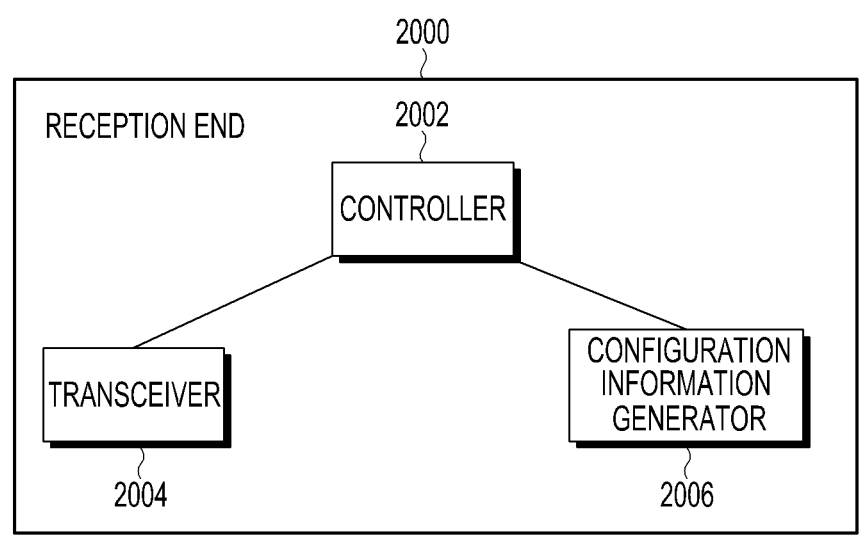
FIG. 20 is a block diagram of a reception end according to an embodiment of the present disclosure.

FIG. 20 is a block diagram of a reception end according to an embodiment of the present disclosure.

Referring to FIG. 20, a reception end 2000 may include a controller (e.g., a processor) 2002, a transceiver 2004, and a memory 2006. The structure of the reception end 2000 may be divided into detailed structures or integrated into one structure depending on an embodiment or operator's intention.

The memory 2006 stores information about configuration sets corresponding to FIGS. 9B, 9C, and 10B, sequence sets for preamble sequences, and spreading sequences mapped thereto. In the above-described embodiments of the specification, the memory 2006 stores all information stored in advance by the device.

The transceiver 2004 transmits a DL broadcast signal according to the above-described embodiments.

The controller 2002 controls the overall operation of the device according to the above-described embodiments, and detects preamble sequences, spreading sequences, and so forth for devices that perform random access, according to the respective embodiments.

FIGS. 19 and 20 illustrate only examples for convenience, and the device and the reception end according to embodiments of the present disclosure may be configured variously. The embodiments of the present disclosure may exist independently or some or all of the embodiments may be applied together with at least one of other embodiments.

While the present disclosure has been shown and described with reference to various embodiments thereof, it will be understood by those skilled in the art that various changes in form and details may be made therein without departing from the spirit and scope of the present disclosure as defined by the appended claims and their equivalents.

The invention claimed is:

1. A method for performing random access by a transmission device in a wireless communication system, the method comprising:
receiving, from a reception device, a broadcast signal comprising configuration information for a preamble sequence transmission region;
selecting a partial region among at least two partial regions included in the preamble sequence transmission region based on the configuration information included in the broadcast signal; and
transmitting a preamble sequence for the random access through the selected partial region,
wherein the configuration information indicates at least two start points corresponding to the at least two partial regions in a time domain and at least two sequence lengths corresponding to the at least two start points.

2. The method of claim 1, wherein the configuration information comprises mode information indicating a scheme for selecting the partial region among the at least two partial regions.

3. The method of claim 2, wherein the selecting comprises:
if the configuration information comprises a first mode information, comparing a receive signal strength of the broadcast signal with a signal strength threshold value; and
selecting the partial region among the at least two partial regions based on a result of the comparing.

4. The method of claim 2, wherein the selecting comprises:
if the configuration information comprises a first mode information, comparing a receive signal strength of the broadcast signal with a signal strength threshold value;
if the receive signal strength of the broadcast signal is greater than or equal to the signal strength threshold value, selecting a first partial region among the at least two partial regions; and
if the receive signal strength of the broadcast signal is less than the signal strength threshold value, selecting one of remaining regions except for the first partial region among the at least two partial regions.

5. The method of claim 2, wherein the selecting comprises:
if the configuration information comprises a second mode information, selecting a random access resource configuration indicated by the second mode information among random access resource configurations shared with a plurality of reception devices; and
selecting the partial region among the at least two partial regions based on the selected random access resource configuration.

6. The method of claim 1, wherein the configuration information comprises at least one of a sequence length according to a service type of the transmission device, or a modulation or coding scheme (MCS) level of the transmission device.

7. A method for detecting random access by a reception device in a wireless communication system, the method comprising:
generating a broadcast signal comprising configuration information for a preamble sequence transmission region;
transmitting, to a transmission device, the broadcast signal; and
receiving, a preamble sequence transmitted by a transmission device through a partial region indicated by the configuration information among at least two partial regions included in the preamble sequence transmission region,
wherein the configuration information indicates at least two start points corresponding to the at least two partial regions in a time domain and at least two sequence lengths corresponding to the at least two start points.

8. The method of claim 7, wherein the configuration information comprises mode information indicating a scheme for selecting the partial region among the at least two partial regions.

9. The method of claim 8,
wherein the mode information comprises one of a first mode and a second mode,
wherein the first mode indicates selecting the partial region among the at least two partial regions based on a comparing result between a receive signal strength of the broadcast signal and a signal strength threshold value, and
wherein the second mode indicates selecting the partial region among the at least two partial regions based on random access resource configurations shared with a plurality of reception devices.

10. The method of claim 7, wherein the configuration information comprises at least one of a sequence length according to a service type of the transmission device, or a modulation or coding scheme (MCS) level of the transmission device.

11. A transmission device for performing random access in a wireless communication system, the transmission device comprising:
a transceiver configured to receive, from a reception device, a broadcast signal comprising configuration information for a preamble sequence transmission region; and
a controller configured to:
select a partial region among at least two partial regions included in the preamble sequence transmission region based on the configuration information included in the broadcast signal, and
control the transceiver to transmit a preamble sequence for the random access through the selected partial region,
wherein the configuration information indicates at least two start points corresponding to the at least two partial regions in a time domain and at least two sequence lengths corresponding to the at least two start points.

12. The transmission device of claim 11, wherein the configuration information comprises mode information indicating a scheme for selecting the partial region among the at least two partial regions.

13. The transmission device of claim 12, wherein, if the configuration information comprises a first mode information, the controller is further configured to:
compare a receive signal strength of the broadcast signal with a signal strength threshold value, and
select the partial region among the at least two partial regions based on a result of the comparing.

14. The transmission device of claim 12, wherein, if the configuration information comprises a first mode information, the controller is further configured to:
compare a receive signal strength of the broadcast signal with a signal strength threshold value,
if the receive signal strength of the broadcast signal is greater than or equal to the signal strength threshold value, select a first partial region among the at least two partial regions, and
if the receive signal strength of the broadcast signal is less than the signal strength threshold value, select one of remaining regions except for the first partial region among the at least two partial regions.

15. The transmission device of claim 12, wherein if the configuration information comprises a second mode information, the controller is further configured to:
select a random access resource configuration indicated by the second mode information among random access resource configurations shared with a plurality of reception devices, and
select the partial region among the at least two partial regions based on the selected random access resource configuration.

16. The transmission device of claim 11, wherein the configuration information comprises at least one of a sequence length according to a service type of the transmission device, or modulation or coding scheme (MCS) level of the transmission device.

17. A reception device for detecting random access by in a wireless communication system, the reception device comprising:
a transceiver; and
a controller configured to:
generate a broadcast signal comprising configuration information for a preamble sequence transmission region, and
control the transceiver to transmit the broadcast signal to a transmission device, and to receive, a preamble sequence transmitted by a transmission device through a partial region indicated by the configuration information among at least two partial regions included in the preamble sequence transmission region,
wherein the configuration information indicates at least two start points corresponding to the at least two partial regions in a time domain and at least two sequence lengths corresponding to the at least two start points.

18. The reception device of claim 17, wherein the configuration information comprises mode information indicating a scheme for selecting the partial region among the at least two partial regions.

19. The reception device of claim 18,
wherein the mode information comprises one of a first mode and a second mode,
wherein the first mode indicates selecting the partial region among the at least two partial regions based on a comparing result between a receive signal strength of the broadcast signal and a signal strength threshold value, and
wherein the second mode indicates selecting the partial region among the at least two partial regions based on random access resource configurations shared with a plurality of reception devices.

20. The reception device of claim 17, wherein the configuration information comprises at least one of a sequence length according to a service type of the transmission device, or modulation or coding scheme (MCS) level of the transmission device.

* * * * *